US008042082B2

(12) United States Patent
Solomon

(10) Patent No.: US 8,042,082 B2
(45) Date of Patent: Oct. 18, 2011

(54) THREE DIMENSIONAL MEMORY IN A SYSTEM ON A CHIP

(76) Inventor: Neal Solomon, Oakland, CA (US)

( * ) Notice: Subject to any disclaimer, the term of this patent is extended or adjusted under 35 U.S.C. 154(b) by 374 days.

(21) Appl. No.: 12/283,455

(22) Filed: Sep. 12, 2008

(65) Prior Publication Data

US 2009/0070721 A1    Mar. 12, 2009

Related U.S. Application Data

(60) Provisional application No. 60/993,550, filed on Sep. 12, 2007.

(51) Int. Cl.
*G06F 17/50* (2006.01)
(52) U.S. Cl. ........ 716/116; 716/100; 716/101; 716/102; 716/103; 716/104; 716/105; 716/117; 716/118; 716/119; 716/138; 365/129; 365/130; 365/131

(58) Field of Classification Search .......... 716/100–105, 716/116–119, 138; 365/129–131
See application file for complete search history.

(56) References Cited

U.S. PATENT DOCUMENTS

| | | | | |
|---|---|---|---|---|
| 5,502,667 | A * | 3/1996 | Bertin et al. | 365/51 |
| 6,515,888 | B2 * | 2/2003 | Johnson et al. | 365/130 |
| 7,193,239 | B2 * | 3/2007 | Leedy | 257/74 |
| 7,402,897 | B2 * | 7/2008 | Leedy | 257/678 |
| 7,633,789 | B2 * | 12/2009 | Norman | 365/148 |
| 7,692,448 | B2 * | 4/2010 | Solomon | 326/38 |

* cited by examiner

*Primary Examiner* — Nghia Doan

(57) ABSTRACT

The invention relates to multi-planar memory components in a three-dimensional integrated circuit system configuration. A multi-planar memory system consisting of a plurality of memory circuit planes in a three-dimensional system on a chip (3D SoC) comprised of a plurality of memory layers, at least one logic circuit layer and an interface configured to provide access to memory and logic circuit layers.

20 Claims, 27 Drawing Sheets

FIG. 3
| L1 | M1 | M2 |
| L2 | M1 & M3 | M2 & M4 |
| | | |
| L1 | M3 | M4 |
| L2 | M5 & M7 | M6 & M8 |
FIG. 4
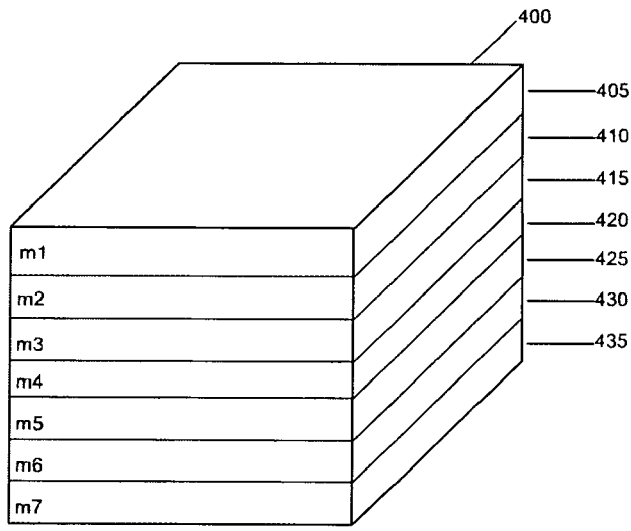
FIG. 5
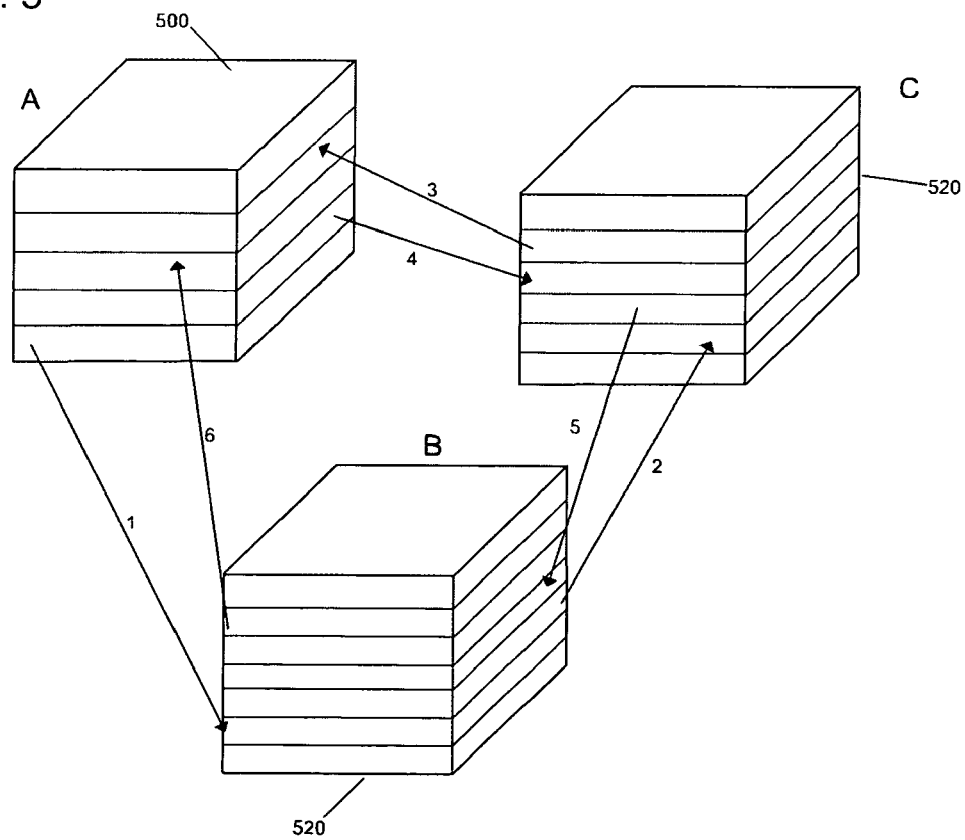

(I)

(II)

(III)

3D Harvard Architecture

THREE DIMENSIONAL MEMORY IN A SYSTEM ON A CHIP

CROSS-REFERENCES TO RELATED APPLICATIONS

The present application claims the benefit of priority under U.S.C. §119 from U.S. Provisional Patent Application Ser. No. 60/993,550 filed on Sep. 12, 2007, the disclosure of which is hereby incorporated by reference in their entirety for all purposes.

FIELD OF INVENTION

The invention involves memory components in a system on chip (SoCs) semiconductor technology and their operations. It also involves multiple processors on silicon (MPSOC) and a system on a programmable chip (SOPC). Components of the present invention involve micro-electro-mechanical systems (MEMS) and nano-electro-mechanical systems (NEMS).

BACKGROUND

The challenge of modern computing is to build economically efficient chips that incorporate more transistors to meet the goal of achieving Moore's law of doubling performance every two years. The limits of semiconductor technology are affecting this ability to grow in the next few years, as transistors become smaller and chips become bigger and hotter. The semiconductor industry has developed the system on a chip (SoC) as a way to continue high performance chip evolution.

So far, there have been four main ways to construct a high performance semiconductor. First, chips have multiple cores. Second, chips optimize software scheduling. Third, chips utilize efficient memory management. Fourth, chips employ polymorphic computing. To some degree, all of these models evolve from the Von Neumann computer architecture developed after WWII in which a microprocessor's logic component fetches instructions from memory.

The simplest model for increasing chip performance employs multiple processing cores. By multiplying the number of cores by eighty, Intel has created a prototype teraflop chip design. In essence, this architecture uses a parallel computing approach similar to supercomputing parallel computing models. Like some supercomputing applications, this approach is limited to optimizing arithmetic-intensive applications such as modeling.

The Tera-op, Reliable, Intelligently Adaptive Processing System (TRIPS), developed at the University of Texas with funding from DARPA, focuses on software scheduling optimization to produce high performance computing. This model's "push" system uses data availability to fetch instructions, thereby putting additional pressure on the compiler to organize the parallelism in the high speed operating system. There are three levels of concurrency in the TRIPS architecture, including instruction-level parallelism (ILP), thread-level parallelism (TLP) and data-level parallelism (DLP). The TRIPS processor will process numerous instructions simultaneously and map them onto a grid for execution in specific nodes. The grid of execution nodes is reconfigurable to optimize specific applications. Unlike the multi-core model, TRIPS is a uniprocessor model, yet it includes numerous components for parallelization.

The third model is represented by the Cell microprocessor architecture developed jointly by the Sony, Toshiba and IBM (STI) consortium. The Cell architecture uses a novel memory "coherence" architecture in which latency is overcome with a bandwidth priority and in which power usage is balanced with peak computational usage. This model integrates a microprocessor design with coprocessor elements; these eight elements are called "synergistic processor elements" (SPEs). The Cell uses an interconnection bus with four unidirectional data flow rings to connect each of four processors with their SPEs, thereby meeting a teraflop performance objective. Each SPE is capable of producing 32 GFLOPS of power in the 65 nm version, which was introduced in 2007.

The MOrphable Networked Micro-ARCHitecture (MONARCH) uses six reduced instruction set computing (RISC) microprocessors, twelve arithmetic clusters and thirty-one memory clusters to achieve a 64 GFLOPS performance with 60 gigabytes per second of memory. Designed by Raytheon and USC/ISI from DARPA funding, the MONARCH differs distinctly from other high performance SoCs in that it uses evolvable hardware (EHW) components such as field programmable compute array (FPCA) and smart memory architectures to produce an efficient polymorphic computing platform.

MONARCH combines key elements in the high performance processing system (HPPS) with Data Intensive Architecture (DIVA) Processor in Memory (PIM) technologies to create a unified, flexible, very large scale integrated (VLSI) system. The advantage of this model is that reprogrammability of hardware from one application-specific integrated circuit (ASIC) position to another produces faster response to uncertain changes in the environment. The chip is optimized to be flexible to changing conditions and to maximize power efficiency (3-6 GFLOPS per watt). Specific applications of MONARCH involve embedded computing, such as sensor networks.

These four main high performance SoC models have specific applications for which they are suited. For instance, the multi-core model is optimized for arithmetic applications, while MONARCH is optimized for sensor data analysis. However, all four also have limits.

The multi-core architecture has a problem of synchronization of the parallel micro-processors that conform to a single clocking model. This problem limits their responsiveness to specific types of applications, particularly those that require rapid environmental change. Further, the multi-core architecture requires "thread-aware" software to exploit its parallelism, which is cumbersome and produces quality of service (QoS) problems and inefficiencies.

By emphasizing its compiler, the TRIPS architecture has the problem of optimizing the coordination of scheduling. This bottleneck prevents peak performance over a prolonged period.

The Cell architecture requires constant optimization of its memory management system, which leads to QoS problems.

Finally, MONARCH depends on static intellectual property (IP) cores that are limited to combinations of specified pre-determined ASICs to program its evolvable hardware components. This restriction limits the extent of its flexibility, which was precisely its chief design advantage.

In addition to SoC models, there is a network on a chip (NoC) model, introduced by Arteris in 2007. Targeted to the communications industry, the 45 nm NoC is a form of SoC that uses IP cores in FPGAs for reprogrammable functions and that features low power consumption for embedded computing applications. The chip is optimized for on-chip communications processing. Though targeted at the communications industry, particularly wireless communications, the chip has limits of flexibility that it was designed to overcome, primarily in its deterministic IP core application software.

Various implementations of FPGAs represent reconfigurable computing. The most prominent examples are the Xilinx Virtex-II Pro and Virtex-4 devices that combine one or more microprocessor cores in an FPGA logic fabric. Similarly, the Atmel FPSLIC processor combines an AVR processor with programmable logic architecture. The Atmel microcontroller has the FPGA fabric on the same die to produce a fine-grained reconfigurable device. These hybrid FPGAs and embedded microprocessors represent a generation of system on a programmable chip (SOPC). While these hybrids are architecturally interesting, they possess the limits of each type of design paradigm, with restricted microprocessor performance and restricted deterministic IP core application software. Though they have higher performance than a typical single core microprocessor, they are less flexible than a pure FPGA model.

All of these chip types are two dimensional planar micro system devices. A new generation of three dimensional integrated circuits and components is emerging that is noteworthy as well. The idea to stack two dimensional chips by sandwiching two or more ICs using a fabrication process required a solution to the problem of creating vertical connections between the layers. IBM solved this problem by developing "through silicon vias" (TSVs) which are vertical connections "etched through the silicon wafer and filled with metal." This approach of using TSVs to create 3D connections allows the addition of many more pathways between 2D layers. However, this 3D chip approach of stacking existing 2D planar IC layers is generally limited to three or four layers. While TSVs substantially limit the distance that information traverses, this stacking approach merely evolves the 2D approach to create a static 3D model.

In U.S. Pat. No. 5,111,278, Echelberger describes a 3D multi-chip module system in which layers in an integrated circuit are stacked by using aligned TSVs. This early 3D circuit model represents a simple stacking approach. U.S. Pat. No. 5,426,072 provides a method to manufacture a 3D IC from stacked silicon on insulation (SOI) wafers. U.S. Pat. No. 5,657,537 presents a method of stacking two dimensional circuit modules and U.S. Pat. No. 6,355,501 describes a 3D IC stacking assembly technique.

Recently, 3D stacking models have been developed on chip in which several layers are constructed on a single complementary metal oxide semiconductor (CMOS) die. Some models have combined eight or nine contiguous layers in a single CMOS chip, though this model lacks integrated vertical planes. MIT's microsystems group has created 3D ICs that contain multiple layers and TSVs on a single chip.

3D FPGAs have been created at the University of Minnesota by stacking layers of single planar FPGAs. However, these chips have only adjacent layer connectivity.

3D memory has been developed by Samsung and by BeSang. The Samsung approach stacks eight 2-Gb wafer level processed stack packages (WSPs) using TSVs in order to minimize interconnects between layers and increase information access efficiency. The Samsung TSV method uses tiny lasers to create etching that is later filled in with copper. BeSang combines 3D package level stacking of memory with a logic layer of a chip device using metal bonding.

See also U.S. Pat. No. 5,915,167 for a description of a 3D DRAM stacking technique, U.S. Pat. No. 6,717,222 for a description of a 3D memory IC, U.S. Pat. No. 7,160,761 for a description of a vertically stacked field programmable nonvolatile memory and U.S. Pat. No. 6,501,111 for a description of a 3D programmable memory device.

Finally, in the supercomputing sphere, the Cray T3D developed a three dimensional supercomputer consisting of 2048 DEC Alpha chips in a torus networking configuration.

In general, all of the 3D chip models merely combine two or more 2D layers. They all represent a simple bonding of current technologies. While planar design chips are easier to make, they are not generally high performance.

Prior systems demonstrate performance limits, programmability limits, multi-functionality limits and logic and memory bottlenecks. There are typically trade-offs of performance and power.

The present invention views the system on a chip as an ecosystem consisting of significant intelligent components. The prior art for intelligence in computing consists of two main paradigms. On the one hand, the view of evolvable hardware (EHW) uses FPGAs as examples. On the other hand, software elements consist of intelligent software agents that exhibit collective behaviors. Both of these hardware and software aspects take inspiration from biological domains.

First, the intelligent SoC borrows from biological concepts of post-initialized reprogrammability that resembles a protein network that responds to its changing environmental conditions. The interoperation of protein networks in cells is a key behavioral paradigm for the iSoC. The slowly evolving DNA root structure produces the protein network elements, yet the dynamics of the protein network are interactive with both itself and its environment.

Second, the elements of the iSoC resemble the subsystems of a human body. The circulatory system represents the routers, the endocrine system is the memory, the skeletal system is comparable to the interconnects, the nervous system is the autonomic process, the immune system provides defense and security as it does in a body, the eyes and ears are the sensor network and the muscular system is the bandwidth. In this analogy, the brain is the central controller.

For the most part, SoCs require three dimensionality in order to achieve high performance objectives. In addition, SoCs require multiple cores that are reprogrammable so as to maintain flexibility for multiple applications. Such reprogrammability allows the chip to be implemented cost effectively. Reprogrammability, moreover, allows the chip to be updatable and future proof. In some versions, SoCs need to be power efficient for use in embedded mobile devices. Because they will be prominent in embedded devices, they also need to be fault tolerant. By combining the best aspects of deterministic microprocessor elements with indeterministic EHW elements, an intelligent SoC efficiently delivers superior performance.

While the design criteria are necessary, economic efficiency is also required. Computational economics reveals a comparative cost analysis that includes efficiency maximization of (a) power, (b) interconnect metrics, (c) transistor per memory metrics and (d) transistor per logic metrics.

SUMMARY 3D memories allow more data storage, faster access and multiple access pipelines when compared with typical planar memory modules. The use of 3D memories in a SoC reflects a new dimension in computing capabilities.

Memory is both internal (embedded memory layers) and external to 3D ICs in a SoC. The invention uses various techniques to control access to different memory configurations in a 3D system, including multi-pipelining, cluster accessing, just-in-time memory optimization, intermittent archiving, space-sensitive reprioritization, cache reorganization, intelligent memory operation, memory reconfiguration and 3D stream processing. The combination of these techniques maximizes computational performance and increases system efficiency.

The invention contains fully integrated flexible 3D memory. The system uses different memory types in a hierarchical memory-sharing configuration as well as multi-pipelines for memory-sharing between IC logic components. To maximize performance, the system uses a just-in-time intelligent memory approach. The system also employs 3D active memory that integrates logic circuitry, cache and router in the memory device. Moreover, the system uses reconfigurable 3D memory. Efficient memory management accesses 3D RAM using adaptive queue processing.

The invention also develops an integration of multiple memory types on a single layer and within memory nodes. The multiple memory types include SRAM, DRAM, SDRAM and ADRAM. The multiple memory types are integrated into a hierarchical system which is then reprioritized for specific uses. This presents the present invention with the capacity for reconfigurable memory dynamics for specific simultaneous applications. The integrated memory system uses hybrid algorithms to calibrate the timing of access to the multiple memory times from separate logic circuits for different applications.

The disclosure describes how to solve problems involving memory management, including memory optimization, memory timing access and multi-layer memory organization.

Optimization problems that the system solves can be divided into two classes: bi-objective optimization problems (BOOPs) and multi-objective optimization problems (MOOPs).

BOOPs consist of trade-offs in semiconductor factors such as (a) energy consumption versus performance, (b) number of transistors versus heat dissipation, (c) interconnect area versus performance and (d) high performance versus low cost.

Regarding MOOPs, the multiple factors include: (a) thermal performance (energy/heat dissipation), (b) energy optimization (low power use), (c) timing performance (various metrics), (d) reconfiguration time (for FPGAs and CPLDs), (e) interconnect length optimization (for energy delay), (f) use of space, (g) bandwidth optimization and (h) cost (manufacture and usability) efficiency. The combination of solutions to trade-offs of multiple problems determines the design of specific semiconductors. The present system presents a set of solutions to these complex optimization problems.

One of the chief problems is to identify ways to limit latency. Latency represents a bottleneck in an integrated circuit when the wait to complete a task slows down the efficiency of the system. Examples of causes of latency include interconnect routing architectures, memory configuration and interface design. Limiting latency problems requires the development of methods for scheduling, anticipation, parallelization, pipeline efficiency and locality-priority processing.

NOVELTIES 3D memory components are shared and continuously optimized in the present memory management system. A hierarchy of memory elements is employed in short-term (short-range) and long-term capacities to optimize logic processing. 3D active memory devices are employed as well as reconfigurable 3D memory. Adaptive queue processing modifies the order of memory queuing to change data priorities and accelerate system performance.

ADVANTAGES OF THE PRESENT SYSTEM

Because it uses 3D logic and memory nodes, the system has closer memory access and faster response. Memory is accessed more rapidly also because of the routing architecture enabled by 3D spatial configurations which are pipelined to multiple node layers. The system uses 3D active, or smart, memories. The system also uses reconfigurable memory for efficiency maximization. Adaptive queue processing allows reprogrammable optimization in a memory management system.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.) the terms (including a reference to a "means") used to describe such elements are intended to correspond, unless otherwise indicated, to any element that performs the specified function of the described element (i.e., that is functionally equivalent), even though not structurally equivalent to the disclosed structure that performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

ACRONYMS 3D, three dimensional
AQP, adaptive queue processing
ASDRAM, adjustable synchronous dynamic random access memory
ASIC, application specific integrated circuit
ASMC, application specific memory customization
BOOP, bi-objective optimization problem
CMOS, complementary metal oxide semiconductor
CPLD, complex programmable logic device
CPMD, complex programmable memory device
DCP, data compression processing
D-EDA, dynamic electronic design automation
DIVA, data intensive architecture
DLP, data level parallelism
DRAM, dynamic random access memory
EDA, electronic design automation
EDRAM, embedded dynamic random access memory
EHW, evolvable hardware
eMOOP, evolvable multi-objective optimization problem
ePROM, erasable programmable read only memory
FIFO, first in first out
FLOPS, floating operations per second
FPCA, field programmable compute array
FPGA, field programmable gate array
FPU, floating point unit
HPPS, high performance processing system
ILP, instruction level parallelism
IP, intellectual property
LRF, local register files
iSoC, intelligent system on a chip
MAC, multiply accumulate converter
MEMS, micro electro mechanical system
MONARCH, morphable networked micro-architecture
MOOP, multi-objective optimization problem
MPSOC, multi-processor system on a chip
NEMS, nano electro mechanical system
NoC, network on a chip PCA, polymorphous computing architecture
PIM, processor in memory
RISC, reduced instruction set computing
SCOC, supercomputer on a chip
SoC, system on a chip
SOI, silicon on insulation
SOPC, system on a programmable chip
SPE, synergistic processor element
SRF, stream register file
TLP, thread level parallelism
TRIPS, Tera-op reliable intelligently adaptive processing system
TSV, through silicon via
VLSI, very large scale integration
WSPS, wafer level processed stack packages

DESCRIPTION OF THE DRAWINGS

FIG. 3 is a table describing the connections between memory tiles between two layers in a multilayer IC.

FIG. 4 is a schematic drawing of a multilayer memory module.

FIG. 5 is a schematic drawing illustrating the data flow between three multilayer memory modules.

Figure 1:
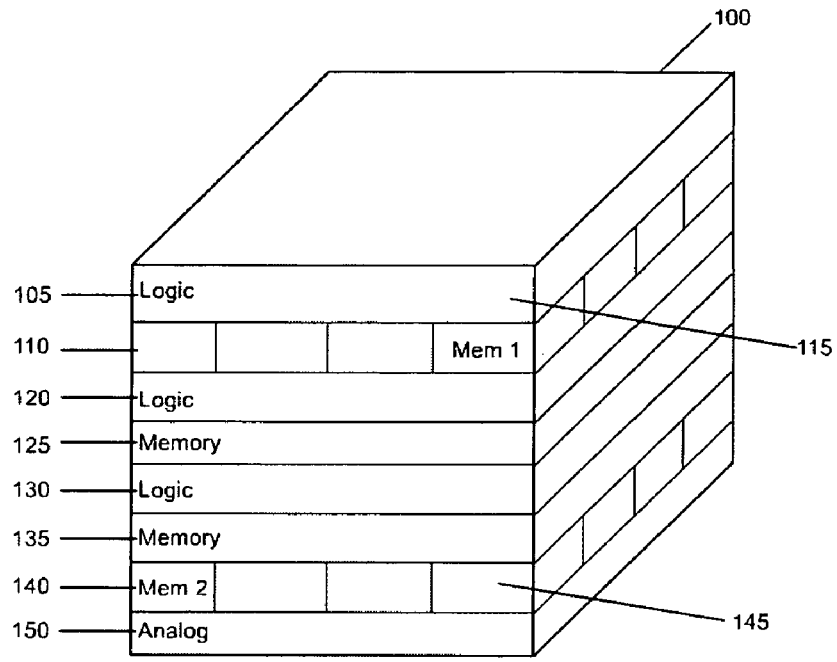
FIG. 1 is a schematic diagram of a multilayer hybrid integrated circuit.

DETAILED DESCRIPTION OF THE DRAWINGS (I) 3D iSoC Memory Components (1) Intra-Node Memory in 3D IC.

Every 3D IC node contains at least one memory layer. This memory layer consists of embedded dynamic random access memory (eDRAM) which contains a cache for temporary storage. The cache storage is accessed first for efficiency and reuse of commonly accessed data.

eDRAM consists of very densely packed rows of cells that have large capacity storage of 64 to 128 GB and data transfer rates of 8 GB/sec. Some 3D ICs have multiple layers of memory, in which cases the IC accesses multiple layers simultaneously. Memory layers are sandwiched between logic layers for rapid access. In one embodiment, the central memory layers abut the logic layers so as to provide maximum access to memory.

In another embodiment, memory tiles exist on logic layers of a 3D IC. Memory tiles are placed on the outer rim of the layer for access by the logic tiles in the center. Given this configuration, the IC may access the on-layer memory tiles while also accessing other memory layers or tiles from other logic layers at peak capacity.

Intra-node memory is generally not adequate to complete complex computing tasks, much like RAM is needed for a traditional microprocessor, to supplement its own on-chip memory.

(2) Multi-Pipelining in 3D Satellites Around IC Node in 3D SoC Using Adjustable Synchronous DRAM The 3D memory module is a major feature of the 3D SoC. In a three dimensional environment, there is more spatial real estate in a more compact and efficient configuration than in traditional planar memory configurations. In addition, there is more flexibility in accessing specific sections of 3D memory.

The present invention introduces the adjustable synchronous dynamic random access memory (ASDRAM). The ASDRAM has multiple memory layers in a 3D module. In the traditional synchronous DRAM, a chip's clock synchronizes the storage and access operations of the memory module and optimizes performance. In the ASDRAM, the chip's clock speed is variable. Because each octahedron in the SoC has an asynchronous clock, wherein the clocks of each of the eight sections and the central node are not synchronized and are variable (in a multiple variable asynchronous clock configuration), the ASDRAM adjusts its storage and access speed. In one embodiment, the ASDRAM accepts 16 consecutive words per clock cycle. However, because the clock speed is modulated, this absolute speed will vary.

The 3D memory module has up to 1 Terabyte of RAM with 40-bit addresses, though 64 Gb of RAM with 36-bit addresses are typical. Each 64 Gb module consists of 16 memory layers of 4 Gb each. Activation of several memory modules simultaneously will yield 64 Gb/sec data transfer rates.

The present invention uses the Harvard architecture to separate instructions and data into distinct storage and signal pathways. In the case of IC embedded memory, instructions are prominently accessed. This leaves the majority of external 3D memory modules to be used for referencing data.

Each memory module is accessed using multiple pipelines. The system breaks up data sets into different pipelines and feeds the pipelines to varied memory modules to minimize latency. Each data stream is tagged with metadata to track its routing path.

In an alternative embodiment, a spherical 3D memory module is configured. Multiple spherical memory modules surround each IC module.

(3) 3D Hierarchical Multi-Memory-Type Sharing Between 3D ICs in 3D SoC

The system utilizes different memory types. On-board eDRAM is used on the IC, while ASDRAM is used in 3D memory modules. The system uses multiple other memory mechanisms in addition, including nonvolatile flash RAM and erasable programmable read only memory (ePROM) as well as hard disk drives and optical storage. Each of these memory devices represents a specialized application. For example, DRAM and ePROM are useful in FPGAs, while hard disk drives and optical memory are useful for archival storage. On-board memories are critical for rapid access, while off-chip storage is useful for less critical applications.

The present invention uses a hierarchy of memory types. Its nearby memory module satellites provide short-term memory storage and access, while its outer layers provide longer-term memory storage and access.

In one embodiment of the system, an active database system constantly recirculates the data flow to maximize storage efficiency and optimize computability.

The use of a hierarchical memory scheme in the 3D SoC allows continuously adjustable access to memory for each IC, which effectively minimizes latency and constantly balances the memory load. Not only is the system hierarchical, it is also parallel, since it uses multiple memory modules for each neighborhood. The memories are clustered in each of eight main neighborhoods plus in the central node. These clusters also work together during peak periods by allocating different priorities of memory to specific memory modules.

(4) 3D Memory Sharing within Cluster of 3D SoC Octahedron Nodes

Each of the eight neighborhoods in the 3D SoC consist of 4 to 8 3D IC nodes, and each node has at least one 3D satellite memory module associated with it. The memory modules within each octahedron work together to coordinate their functions. Once the configuration of each neighborhood is organized by the use of optimization algorithms, the memory modules are assigned to specific neighborhoods. The specific sets of memory modules in each neighborhood are then organized to store and access data from the ICs in that neighborhood. A parallel memory caching process is used to organize the memory modules in each neighborhood. Data sets are stored and actively rearranged in these storage devices via use of register locations.

This model is similar to the human endocrine system where glandular nodes are organized to perform specific functions in a network in the human body. Similarly, in the 3D SoC, the memory modules are organized in clusters of satellites at key locations to perform specific functional operations.

(5) Alternating Hybrid Memory Allocation with Scheduling and Pre-Fetching Features for Just-In-Time Intelligent Memory Optimization Data are stored in memory by allocating data packets in a temporal sequence. In a microprocessor, data are fetched from memory to retrieve a set of data packets. In the storage process, data are scheduled (pushed), while in accessing the data in storage, they are fetched (pulled). In a system with multi-pipelining, the data are pre-fetched in the storage process so as to allocate them in memory; pre-fetching is a form of scheduling the retrieval of data rather than the storage of the data. Dynamic pre-fetching allows the system to dynamically reassign data to different locations.

Data are allocated and retrieved just-in-time in an intelligent memory system. The locations for the data storage are ordered, and these locations are efficiently accessed by employing scheduling and pre-fetching procedures. Data are continuously reassigned to available memory in the hierarchical memory system and are constantly reprioritized so as to provide a just-in-time response to data retrieval requests. Scheduling is not set at regular intervals but is contingent upon specific application processes. Use of scheduling and pre-fetching processes represents an alternating hybrid model for memory allocation and retrieval.

Data flows are seen as a dynamic process in which the memory storage components are part of the more complex logic and arithmetic computational process. Since each main task has a distinct memory flow bias, anticipating memory data flows by using the push-pull processes of scheduling and pre-fetching provides a customized algorithm to optimize data flow in an interactive memory system to accomplish specific tasks.

(6) Efficient Access of 3D RAM in 3D SoC Using Adaptive Queue Processing

Since the 3D SoC is a high performance VLSI computing environment, the data and instruction storage process is dynamic. In order to optimize the memory system, it is necessary to constantly rearrange data in the memory chambers in 3D memory modules.

The 3D memory modules have a queue that prioritizes entering data. The queue is constantly re-ordered by using schedule reallocation algorithms that are biased to specific applications and tasks. The queue preferences of a memory module change on demand with the changing conditions of the application. This approach is called adaptive queue processing (AQP).

Data that are typically input into a queue are ordered on a first in first out (FIFO) basis. However, in the AQP model, the first out may be a different order than the first in, depending on the changing priorities of the system. This model is far more efficient because it means that the queue behaves as a filter for data in the memory storage and retrieval process. The AQP model provides the system maximum flexibility.

The AQP model is similar to changing the order of people getting off an elevator compared to the order to those entering. Reorganizing the order of exit allows the memory management system to optimize performance, particularly with changing parameters. In highly indeterministic applications, data is constantly reprioritized as lower priority data is held in the queue longer compared to high priority data.

(7) Off-Loading Archival Memory at Regular Intervals from 3D SoC

Several types of memory are organized in different locations of the SoC, including those embedded in the IC modules, in separate memory modules and in long term storage terminals, both on-chip and off-chip; it is necessary to periodically archive data into long-term storage.

In general, data constantly recirculate in the SoC as it processes large amounts of data and instructions. The locations of data storage in an IC are reprioritized, with the most recent data storage requests given highest priority. The hierarchical model of multi-level memory allows the eventual off-loading of less important data into archival storage facilities. These long-term storage capabilities take the form of flash drive storage in the sleeves (planes on the façade) of the packaging of the cubic structure of the 3D SoC, in external hard drives and in external optical memory storage devices.

External optical memory reservoirs are used for long term archiving of data. In some optical storage systems, a terabit of data will consume a cubic centimeter of space. These large petabyte and exabyte storage warehouses are useful for not only outbound storage of one or more 3D SoCs but also for access to large data facilities.

The regular schedule for the allocation of data to long-term resources is made at different times based on the particular application demands for memory storage.

(8) Memory Reprioritization Between Short-Term and Long-Term and Between Space-Sensitive Aspects in Multi-Memory System in 3D SoC Not only are data reorganized for the storage and off-loading of archival memory in a SoC that recirculates data, but the modulation of data is optimized between the nearest memory modules. In a 3D IC, the embedded memory is the highest priority memory, accessible in part because of its proximity to the logic and arithmetic circuits and in part because it is the fastest accessible memory. However, in the 3D SoC, multiple memory modules are accessible for each IC node. Consequently, it is necessary to allocate memory to or access memory from specific memory modules in a particular IC at a particular time.

Since the neighborhood configuration of clusters of ICs and memory modules vary with each application, the composition of the set of memory modules likewise vary with each application. A memory management optimization algorithm determines the closest memory module accessible for a specific task and prioritizes the data schedule to use this module. All of the memory modules in a neighborhood cluster are prioritized, and reprioritized, for memory allocation and accessibility. As the flow process of the reorganized memory changes, the optimization dynamics of the process change as well.

(9) Complex Programmable Memory Device (CPMD): 3D Active Memory in 3D SoC with Integrated Logic Circuit, Cache and Router An active memory system consists of an integrated logic circuit controller within a memory circuit. In the context of a 3D memory module, at least one layer consists of a logic circuit to control the operation of the memory. The integration of a logic circuit into a larger memory module allows data to be allocated efficiently using a database management system (dbms). The logic circuit layer and the dbms allow a 3D active memory module to have logic functionality to optimize memory operations and to interact with other 3D active memory modules.

An advanced model for an active memory module is the processing-in-memory (PIM) chip used in the Data IntensiVe Architecture (DIVA). DIVA contains a mini-router for routing data to memory and a cache. Simple ASIC or MP capabilities lie within memory itself so as to increase efficiencies. This model is designed to minimize latencies by employing active caching processes in a dynamic memory system.

The present system uses a 3D active memory architecture called a complex programmable memory device (CPMD). The CPMD switches from a static memory storage position to the adaptive memory position described herein by employing at least one logic circuit on at least one layer of the 3D memory module. The memory cells are periodically restructured in order to optimize the allocation of data and instructions in the 3D memory module.

The system constantly rebalances its memory load proactively by employing on-demand memory management algorithms to optimize the memory system for specific applications. For example, caches are periodically modified by altering the priority of the queue. By periodically adjusting the routing priorities of the data in the memory flow process, the system is constantly optimized.

In addition to including a logic circuit on-board a 3D memory module, the present system also has a router as a layer in the 3D memory module. The router conducts interactions between the module and IC nodes and memory modules in the system.

(10) Stream Processing in Multi-Node 3D SoC with 3D Register Hierarchy

Stream processing is a method of accelerating the processing of data and instruction flows in an integrated circuit. It uses a register hierarchy consisting of a floating point unit (FPU) such as a multiply accumulate converter (MAC), local register files (LRFs) and stream register files (SRFs). Each FPU reads LRFs and distributes the data to other LRFs in a cluster. The overlapping operation of logic units makes the streaming process extremely efficient. For example, the next logic operation does not wait for the last data set before proceeding because the pipeline is paralleled for continuous operation with minimum latency. The stream processing architecture uses multiple parallel caching to simultaneously process multiple data streams.

The stream processing architecture is optimized in the present system because it uses the register hierarchy in a 3D environment. Each of the FPU, MAC, LRF and SRF may be situated on different layers of a single 3D active memory module or on different layers of a 3D IC module (FPGA, ASIC or MP). Further, interaction may occur between the FPU of one 3D active memory module and the LRF or SRF of other 3D memory modules or other 3D IC modules at different locations. This advanced model depicts the stream network structures in the 3D SoC that consists of multiple virtual memories.

(11) Reconfigurable Memory in 3D SoC

The present 3D SoC memory system is reconfigurable on several levels. First, each 3D memory module is reconfigurable as described above. Second, each cache is reconfigurable because we have shown how to reconfigure the queuing order by reprioritization on-demand. Finally, the memory system itself is reconfigurable as described in the CPMD.

The advantage of reconfigurability emphasizes the flow control characteristics of the present system. Further, the memory hierarchy model described in the 3D SoC is customizable to specific applications to provide application specific memory customization (ASMC). The oscillation between different applications provides an important plasticity capability that other chips lack. The reconfigurability of the 3D SoC far transcends the reconfigurability of a CPLD and thus represents a major advance in the art of computing sciences.

(12) Compression Algorithms Applied to Memory Allocation Processes in SoC

Data streams in an SoC are divided into different sized data packets. The data packets are compressed as they enter specific memory module caches. The varied size of data packets reflects different word lengths. The specific differentiated word length is determined by flow control of each cache. Data packet sizes are modulated by a cache. When a cache is near capacity, smaller packets are accommodated. The memory compression system in the SoC is called data compression processing (DCP).

Data packets are compressed when data flows from a logic circuit to a memory module and decompressed when data from a memory module to a logic circuit. Data packets are also compressed and decompressed as data flows between memory modules.

Compress-decompress (codec) algorithms are used in memory cache to enable data compression.

The compressed data packets are ordered and reordered in memory queues. In one embodiment, the system uses FIFO priority ordering of data. In another embodiment, the system uses AQP methods of reprioritizing data output sequences.

Compression of data packets occurs between: (a) eDRAM and DRAM, (b) DRAM and SRAM, (c) eDRAM and SRAM, (d) DRAM and Flash, (e) DRAM and EPROM and (f) logic and memory. Different algorithms are selectively applied to each relationship to optimize performance.

Data compression algorithms accelerate data flows in a SoC. Compression is particularly effective in memory intensive applications, such as data mining.

(II) Integration, Reprioritization, Hierarchical Organization and Dynamics of Multiple Memory Modules While logic devices can be constructed into reconfigurable hardware, memory devices are not reconfigurable. Memory components are therefore a limiting factor in complex programmable and hybrid logic devices because once they are designed and installed, they are inflexible. Specific types of memory apparatuses must be placed in specific strategic locations in which a specific memory type is anticipated by the multiple modes of logic hardware reconfiguration. This memory limitation presents a constraint on complex computing systems.

The present system overcomes this constraint by using multiple memory types in specific memory tiles, layers and modules. The integrated memory system consists of multiple memory types in a hierarchical configuration for the prioritization and reprioritization of memory utility for specific computing applications. Thus, while the memory components are fixed in specific locations, their dynamic utility is reconfigurable. The pathways of access to the multiple hierarchical memory types are reconfigurable. Swarm algorithms are applied to organizing the management of the integrated memory system and in controlling the variable dynamics of multiple memory access in complex computational processes.

(1) Integrated Memory System with Multiple Memory Types

The present system describes the use of multiple memory types in a memory layer or multilayer memory module. Multiple types of RAM, including SRAM, DRAM, SDRAM and ADRAM are configured in a single memory layer in two ways. First, the different memory types are on tiles configured on a memory layer. Second, the different memory types are organized in a lattice grid with different memory types in parallel or alternating rows. The logic devices store and access the different memory types at specific junctions.

In cases in which the SRAM is integrated with DRAM types, the memory layer is structured for closer access to an FPGA. The SRAM tiles are adjacent to on-board FPGA SRAM blocks for supplemental memory access. For a microprocessor, the memory layer is organized to have a priority of access with different types of DRAM. The computing system toggles between memory types in different rows.

In an additional embodiment, a hyper active memory module is used which features multiple memory layers and an FPGA controller. Active memory devices are storage devices which typically contain a microprocessor as a controller. Yet, the ability to provide dramatically faster storage and access speeds, while also maintaining extreme flexibility, exists in a hyper active memory module.

(2) Integrated Memory System Applied to Integrated Logic Components in 3D SoC.

Since the 3D SoC contains multiple logic devices, including hybrid and reconfigurable logic devices, it is necessary to access multiple memory types from multiple logic device types. This is a key advantage of the use of an integrated memory system, viz., the ability to access different memory components by multiple logic components in the system while maximizing computing efficiencies. By employing the integrated memory system, FPGAs and MPs access different memory types that optimize their computing processes. Different biases of SRAM components are tailored to FGPAs, while eDRAM components are used by both MPs and reconfigurable hardware.

The use of the integrated memory system is optimized by its hierarchical structure. The higher priority memory components are structured to be used by specific logic devices. For instance, different priorities of diverse memory cache types are emphasized with different types of logic components. SRAMs are strategically located for access by FPGAs. The system structures specific memory layers and modules to customize function with different logic types, with higher priority access to specific memory types from specific logic types.

The system uses modified Harvard architecture for multiple logic access to both data and instructions in different locations.

(3) Reconfigurable Dynamics of Multiple Memory Structures

The system uses reprogramming priorities of access to different memory structures by reconfigurable logic devices. Particularly in the case of reprogrammable computing systems, there is a constant reprioritization of data in memory for each transformed logic device configuration. Data therefore constantly recirculates in the memory system to parallel the transformability of the logic system. This process requires continuous optimization.

In order to reprioritize the integrated memory system, data are tagged, with the tags input into constantly updated data registers. As data are reorganized in the integrated memory system, for example from high priority memory components to lower priority memory components, the registers track the data locations during the transformation processes. The registers are constantly updated for the reconfiguring pathways in the integrated memory system to mirror the logic reprogrammability process. In the case of FPGAs, the location of LUTs change as the system updates and reprioritizes its data stream. As the registers are constantly updated in multiple memory components in the system, the register configuration data are forwarded to the central node of the 3D iSoC.

This process of tracking the transformation of the reprioritization of the integrated memory system occurs in multiple parallel tracks. Multiple pipelines perform the reprioritization process as multiple FPGAs transform their configuration and require continuous optimization of their memory components.

This process of multi-pipeline continuous reprioritization of the hierarchies of the integrated memory system allows parallel simultaneous access to multiple memory types from any logic device in the 3D iSoC. The shifting dynamics of the parallel memory access patterns produces plasticity effects with contingency thresholds. The system is continuously remodulating the patterns of the memory modules to store and access data.

(4) Swarm Intelligence Algorithms Applied to Management of Integrated Memory System Swarm intelligence uses biologically inspired computing models to solve complex computational optimization problems. Swarm intelligence algorithms consist of ant colony optimization (ACO), particle swarm optimization (PSO) and stochastic diffusion search (SDS) approaches.

ACO is applied to the management of the integrated memory system by using a "memory" approach to assigning data to specific memory components at specific times to maximize the use of the multiple memory types.

PSO is applied to the management of the integrated memory system by using the nearest neighbor priority to access the closest useful memory type so as to optimize the memory hierarchy system.

SDS is applied to the management of the integrated memory system by using the synthetic approach of optimizing memory management of parallel memory storage and access processes by allowing access to multiple memory components from any logic component at specific times.

Hybrid swarm intelligence algorithms combine these main models for specific integrated memory system applications.

These models suggest different ways to map multiple pathways to multiple memory types in a 3D iSoC. In general, these approaches identify the fastest way to store and access multiple memory from multiple logic devices from different distances while also tracking the transformability of the priorities of the hierarchical memory system.

These complex computational algorithms solve optimization problems involving the use of multiple memory system processes.

Memory components are critical parts of computing systems. The use of multiple memory elements in a 3D SoC introduces a range of new capabilities for computing systems for the storage and access of data and instructions. The use of multiple 3D memory components in hybrid and reconfigurable computing paradigms presents particular advances to the state of the art. The present system introduces a set of advances in memory components and processes as they are applied to 3D IC computing systems.

FIG. 1 shows a hybrid 3D IC with logic and memory layers. The first (105), third (120) and fifth (130) layers are logic layers. The second (110) and seventh (140) layers contain a memory component on only a tile, for example, an embedded memory component such as an eDRAM, for use on a MP layer or an FPGA layer. The fourth (125) and sixth (135) layers are memory layers. The eighth layer contains an analog device. In particular, the logic layers (110, 120, 130 and 140) are able to access memory components on adjacent layers.

Figure 2:
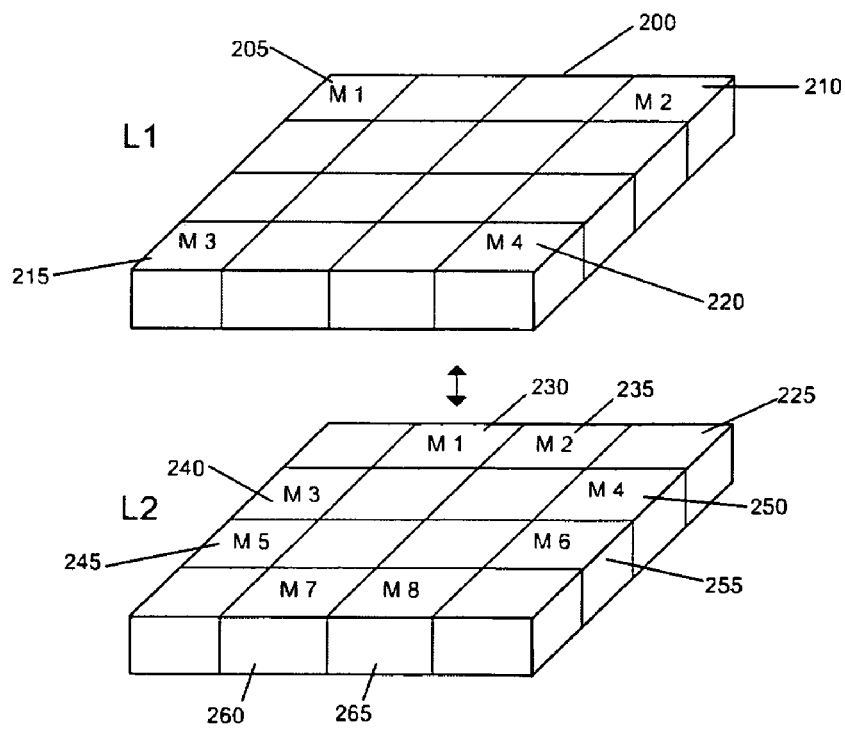
FIG. 2 is a schematic diagram of two IC layers with memory tiles.

FIG. 2 shows two IC layers with memory tiles. L1 contains memory tiles in the corners, while L2 contains memory tiles on the sides (230, 235, 240, 245, 250, 255, 260 and 265). This configuration is useful for accessing memory components from different logic tiles in adjacent layers.

FIG. 3 describes the connections between memory tiles between two layers in a multilayer IC. Using the configuration of the positions of the tiles in FIG. 2, the table indicates the adjoining access of memory tiles at M1 on L1 and M1 and M3 on L2. The tile at M2 on L1 is connected to the tiles of M2 and M4 on L2. The tile at M3 on L1 is connected to the tiles of M5 and M7 on L2. Finally, the tile at M4 on L1 is connected to the tiles of M6 and M8 on L2. This configuration allows access to memory at multiple points on the two layers.

Figure 7:
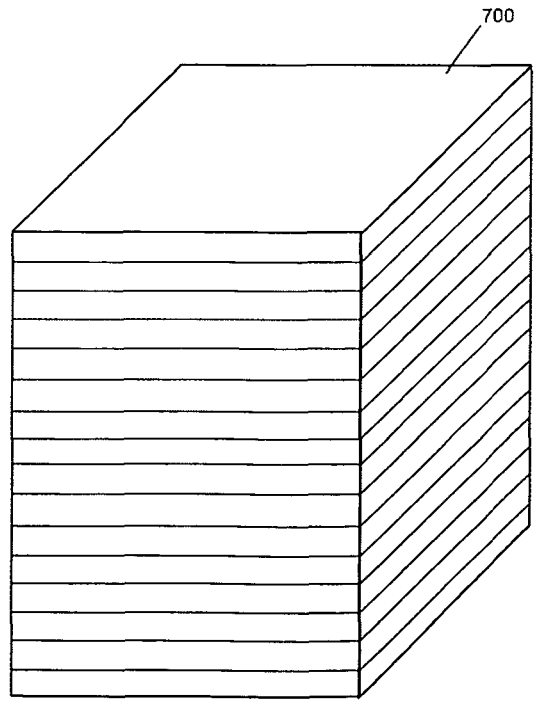
FIG. 7 is a schematic drawing showing a sixteen layer memory module.

Memory modules are not limited to a specific number of layers. FIG. 4 shows a multilayer memory module with seven layers. FIG. 7 shows a stack of sixteen layers in a memory module. Memory modules are used in a 3D iSoC for supplementary memory storage and access capabilities to integrate with multilayer hybrid logic nodes.

FIG. 5 shows the priority of data flows between three multilayer memory modules. Data are initially transferred from layer five in node A to layer six in node B. Data are then transferred from layer 5 in node B to layer 5 in node C. Next, data are transferred from layer two in node C to layer two of node A and then from layer four of node A to layer 3 of node C. Finally, data are transferred from layer four of node C to layer 4 of node B and layer two of node B to layer 3 of node A.

Figure 6:
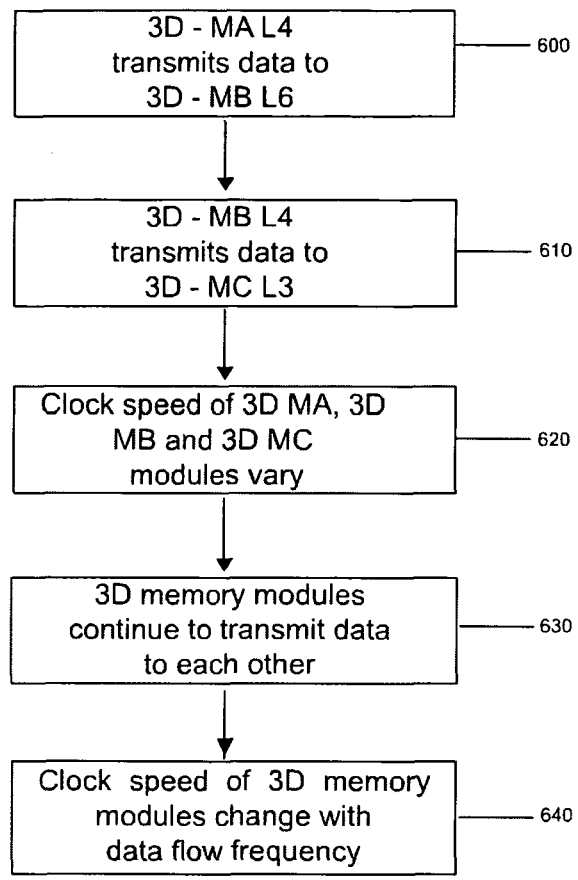
FIG. 6 is a flow chart describing the process of data flows between three multilayer memory modules.

FIG. 6 is a flow chart showing the process of data flows between three multilayer memory modules. After 3D memory module A layer 4 (MA L4) transmits data to 3D MB L6 (600), the system transmits data from 3D MB L4 to 3D MC L3 (610). The clock speed of 3D MA, 3D MB and 3D MC modules vary (620) in order to adjust the temporal priority of data transfer to modulate differentiated memory types with logic processing components. The 3D memory modules continue to transmit data to each other (630) and the clock speed of the 3D memory modules change with data flow frequency (640) changes.

Figure 8:
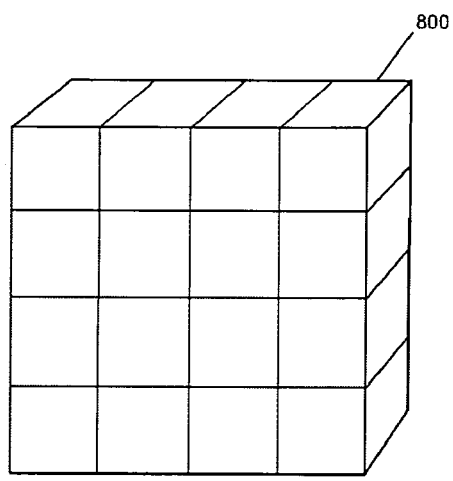
FIG. 8 is a schematic drawing showing a memory layer with 16 tiles in a multilayer IC.

FIG. 8 shows sixteen tiles on a memory layer.

Figure 9:
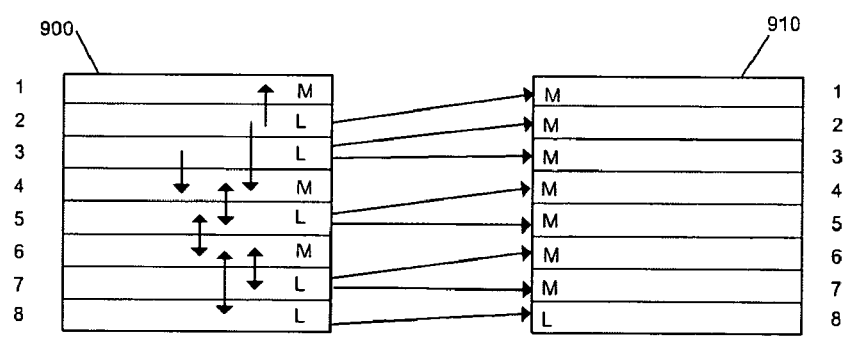
FIG. 9 is a schematic drawing showing a multilayer hybrid IC accessing and storing data in memory layers of a multilayer memory IC.

FIG. 9 shows a multilayer hybrid IC (900) storing and accessing data in memory layers of a multilayer memory IC (910). The logic layers (2, 3, 5, 7 and 8) of the hybrid IC transmit data to different layers of the memory module. Note also the transfer of data to and from memory layers on the multilayer hybrid IC from (and to) the logic layers. The logic layer of the hybrid IC transfers program code to the logic layer of the active memory module as well. Memory is used on the hybrid IC node as well as on the ancillary memory node, particularly for supplemental and lower priority data storage and access.

Figure 10:
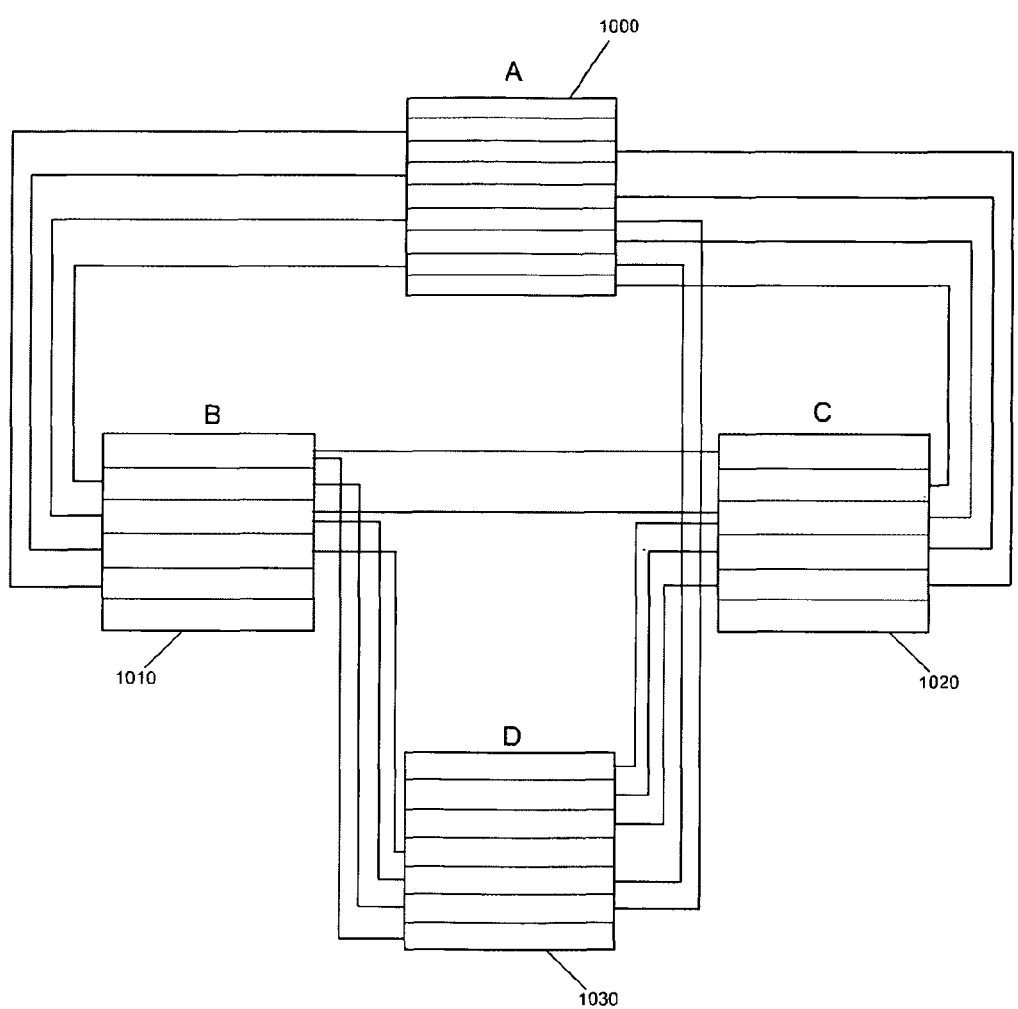
FIG. 10 is a schematic diagram showing memory layers of multilayer memory ICs sharing data between modules.

FIG. 10 shows memory layers of multilayer memory ICs sharing data between modules. The modules, A, B, C and D, store data to and access data from various layers of each module to layers of each module in a network.

Figure 11:
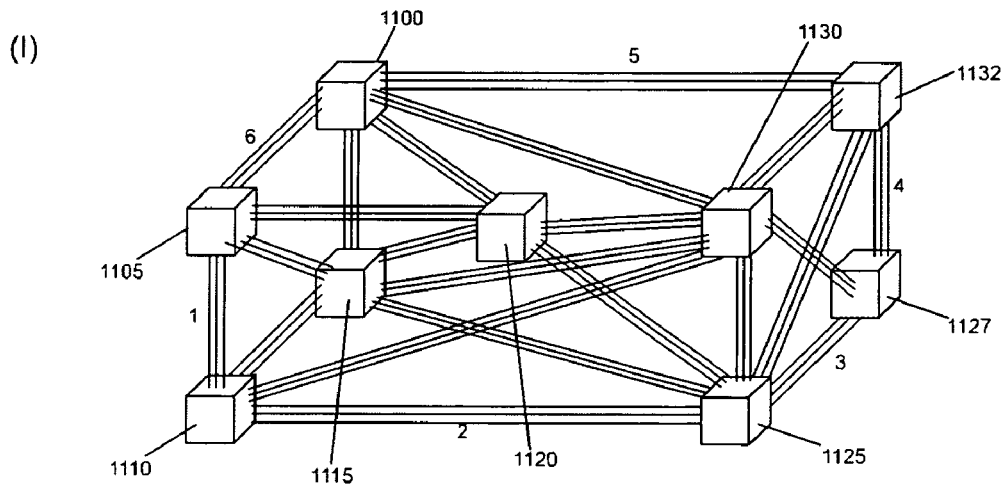
FIG. 11 is a schematic diagram showing the three phases of a process of changing the order of data flows between multiple multilayer IC nodes.
Figure 11:
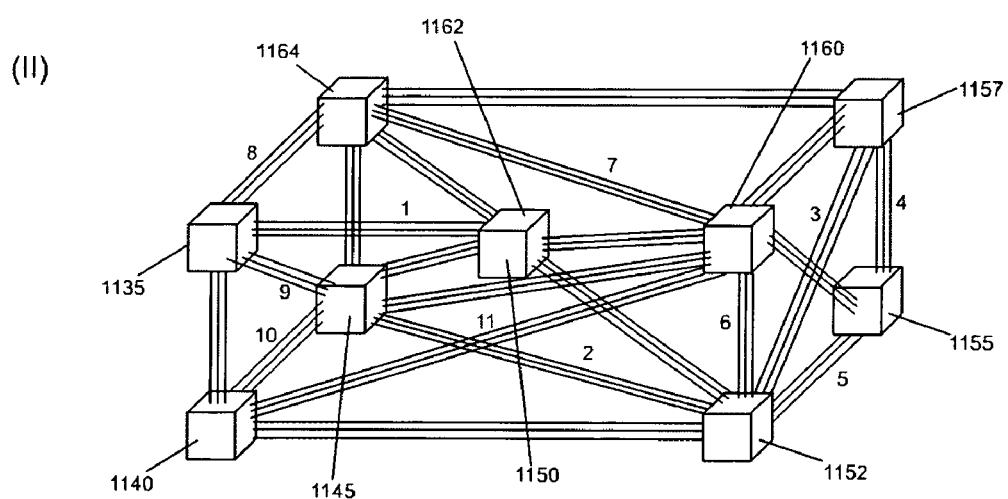
Figure 11:
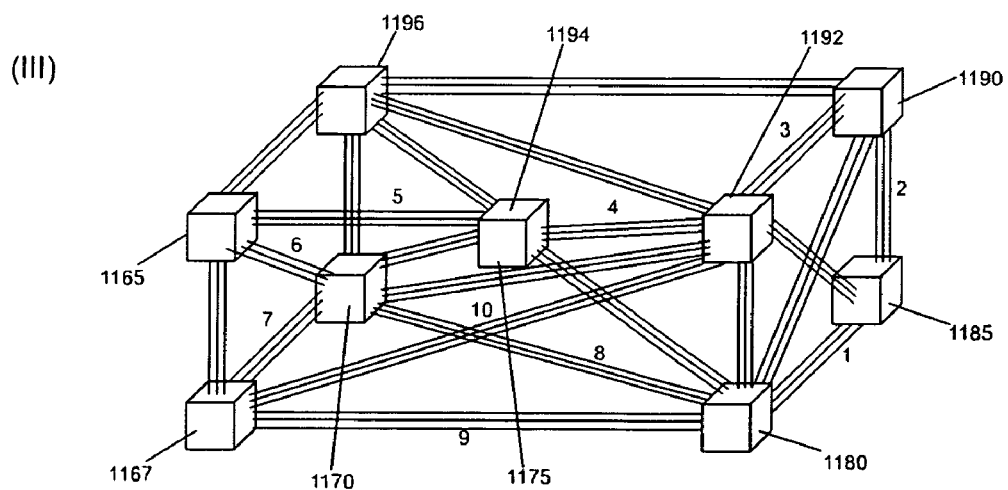

Without specifying the precise 3D node layers used, FIG. 11 shows three phases of a process of changing the order of data flows between multiple multilayer IC nodes in a 3D iSoC. In phase I, the flow of data moves in sequence from node 1105 to 1110 to 1125 to 1127 to 1132 to 1100 and to 1105. In phase II, the flow of data moves from node 1135 to 1150 to 1152 to 1157 to 1155 to 1152 to 1160 to 1164 to 1135 to 1145 to 1140 and to 1160. In phase III, the flow of data moves from node 1180 to 1185 to 1190 to 1192 to 1194 to 1165 to 1170 to 1180 to 1167 and to 1192. While this representation indicates the changing order of data flows in sequential process, the data flow representation occur simultaneously in parallel fashion between different layers of the same nodes in one embodiment.

Figure 12:
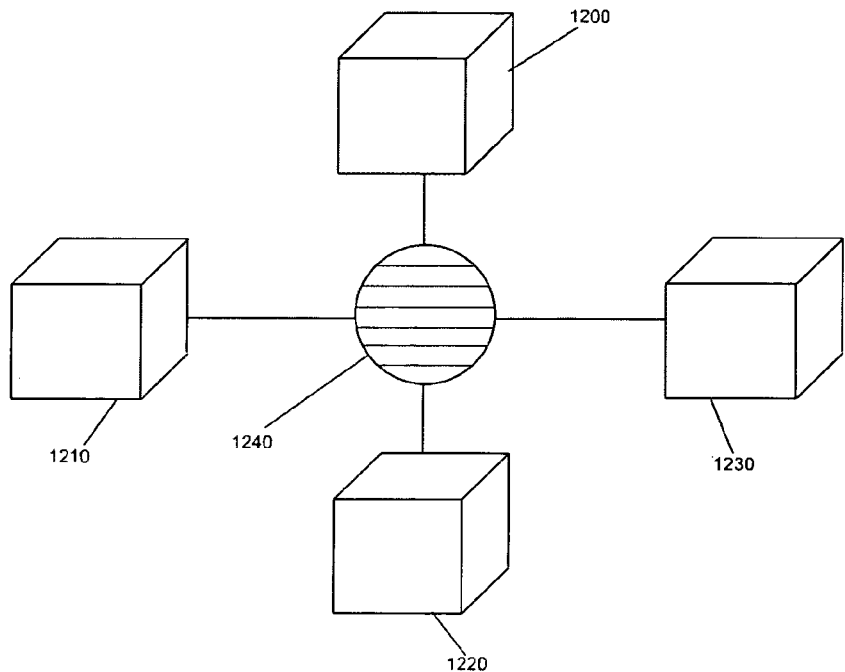
FIG. 12 is a schematic drawing showing a spherical multilayer memory node interacting with multiple multilayer ICs.
Figure 13:
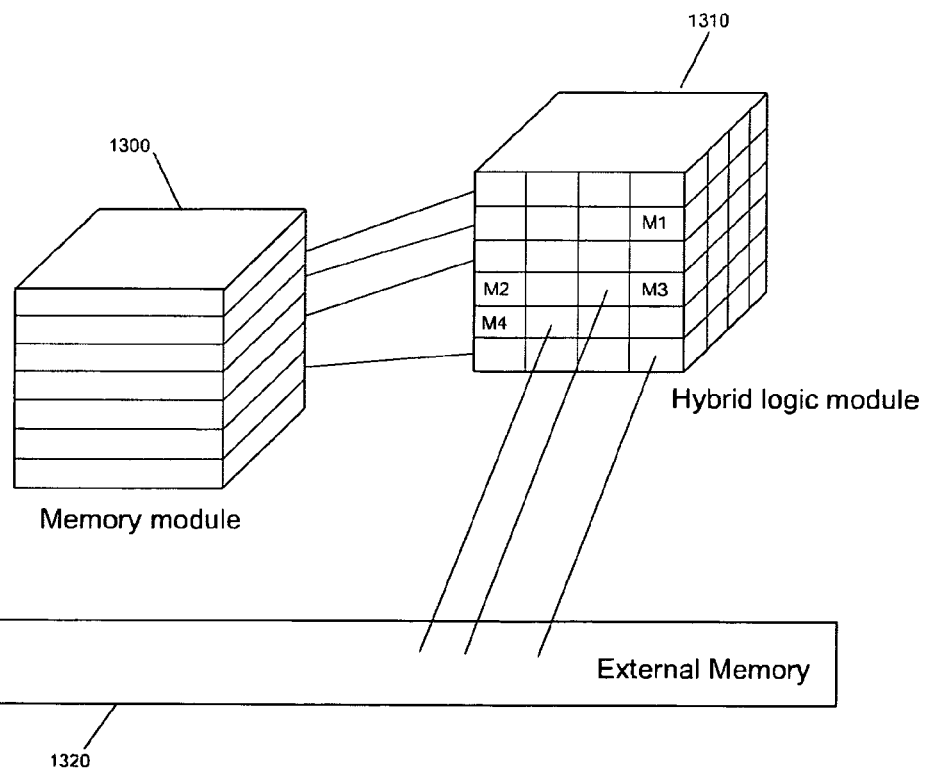
FIG. 13 is a schematic drawing showing the process of constant recirculation of data flows between multiple multilayer IC modules.

FIG. 12 shows a spherical multilayer memory node (1240) interacting with multiple multilayer ICs (1200, 1210, 1220 and 1230). FIG. 13 shows the process of constant recirculation of data flows between multiple multilayer IC modules. Data flow between the 3D memory module (1300) layers 2, 3, 4 and 6 and the 3D hybrid logic module (1310) layers 1, 2, 3 and 6. An external memory (1320) is used by the logic module to store lower priority data sets.

Figure 14:
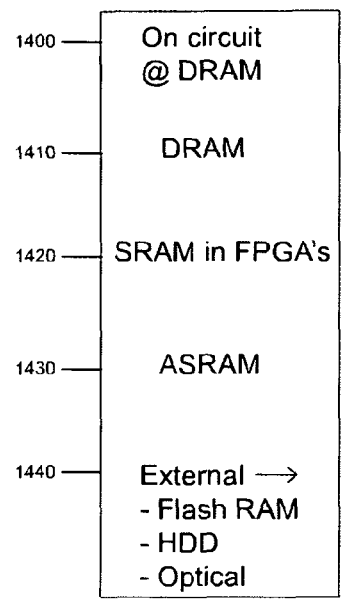
FIG. 14 is a flow chart showing the flow of data between different memory types.

Each 3D memory device contains multiple memory types in order to accommodate multiple simultaneous demands of the logic devices. FIG. 14 shows the use of different types of memory in the multilayer memory devices, though it is not intended to be a systematic or exhaustive list. The memory system includes eDRAM (1400), DRAM (1410) in various versions, SRAM (1420) and ASRAM (1430) (particularly in FPGA layers) and external memory devices (flash RAM, optical drives, etc.) (1440).

Figure 15:
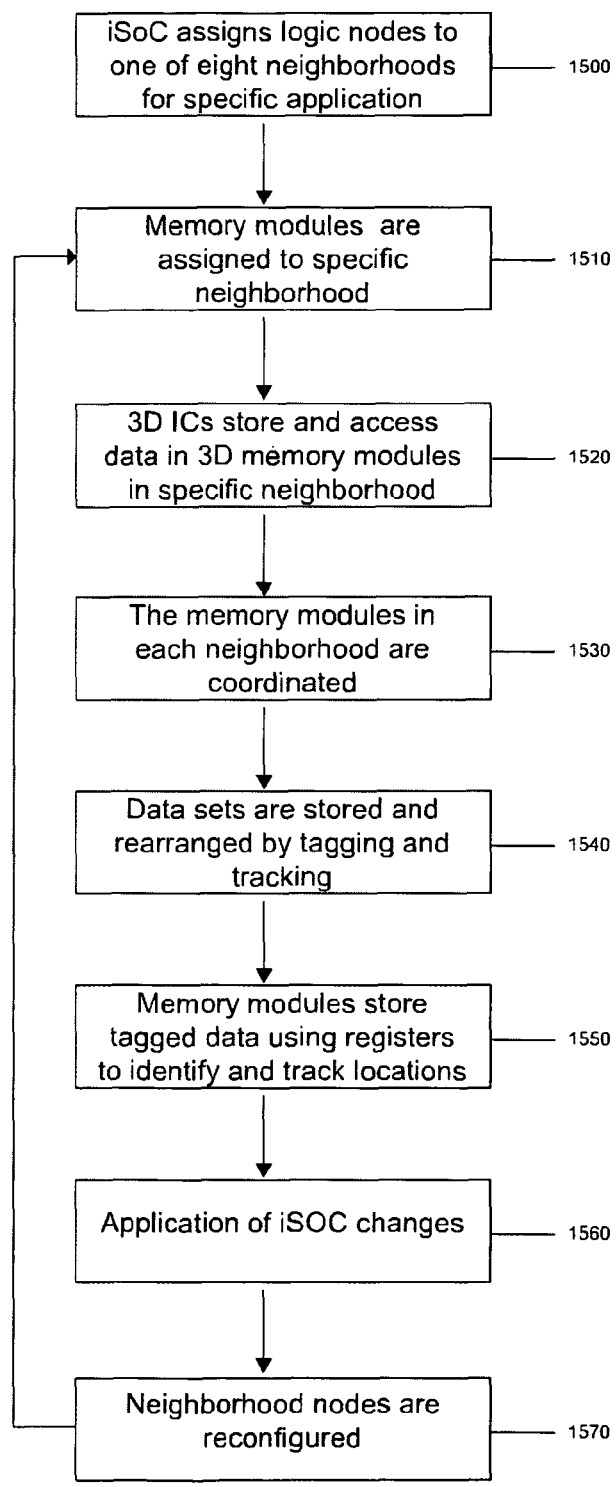
FIG. 15 is a flow chart showing the use of memory modules in a 3D SoC neighborhood cluster.

FIG. 15 is a flow chart showing the use of memory modules in a 3D SoC neighborhood cluster. After the iSoC assigns logic nodes to one of eight neighborhoods for a specific application (1500), the memory modules are assigned to a specific neighborhood (1510). The iSoC stores and accesses data in 3D memory modules in a specific neighborhood (1520) and the organization of the memory modules in each neighborhood are coordinated (1530). The data sets are stored and rearranged by tagging and tracking (1540) and the memory modules store tagged data using registers to identify and track locations (1550). The application of the iSoC changes (1560) and the neighborhood nodes are reconfigured (1570) into a different cluster.

Figure 16:
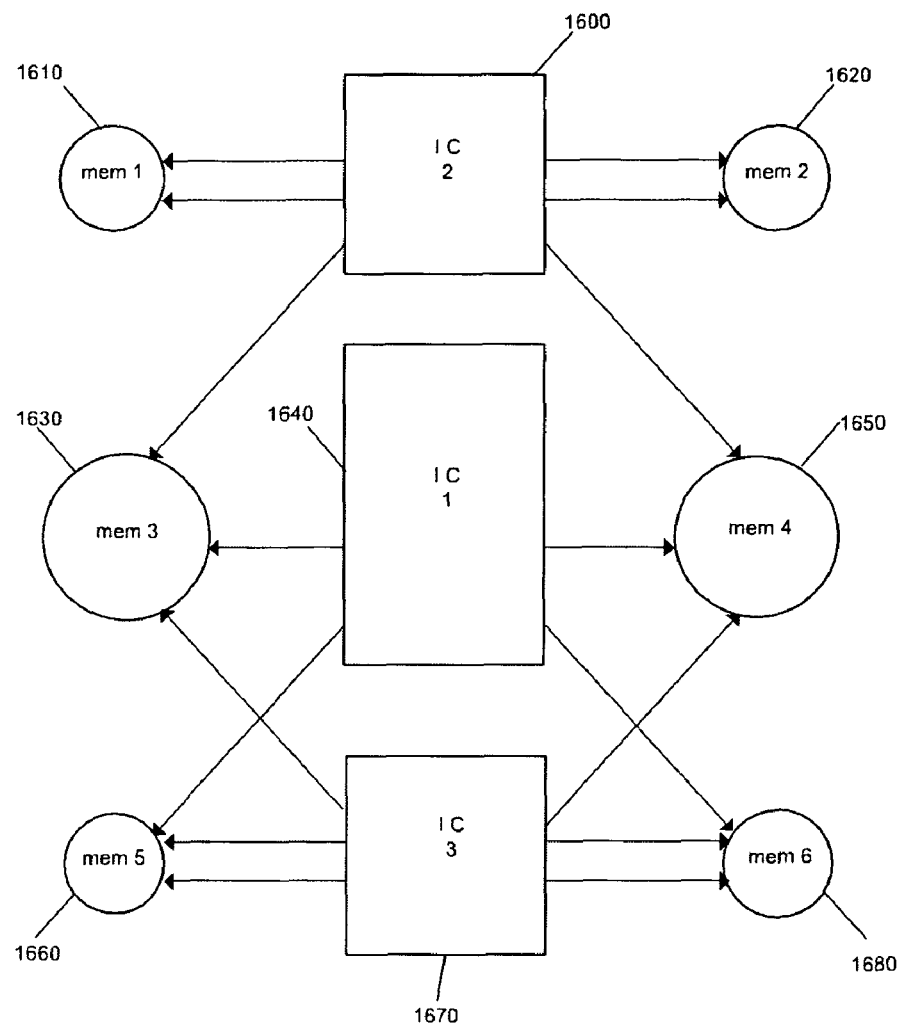
FIG. 16 is a diagram showing the use of memory modules by a multilayer IC.

FIG. 16 shows the use of memory modules by a multilayer IC. IC 1 (1640) accesses all six satellite memory modules (1610, 1620, 1630, 1650, 1660 and 1680). IC 2 accesses memory modules 1 (1610), 2 (1620), 3 (1630) and 4 (1650). IC 3 accesses memory modules 3 (1630), 4 (1650), 5 (1660) and 6 (1680).

Figure 17:
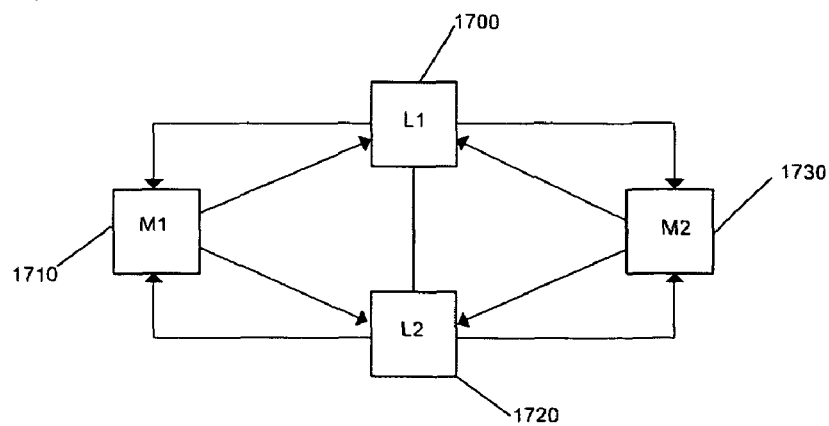
FIG. 17 is a schematic diagram showing the storage and access of data in memory modules from and to logic modules.

FIG. 17 shows the storage and access of data in memory modules from and to logic modules. The two logic modules (1700 and 1720) interact with each other and with the two memory modules (1710 and 1730).

Figure 18:
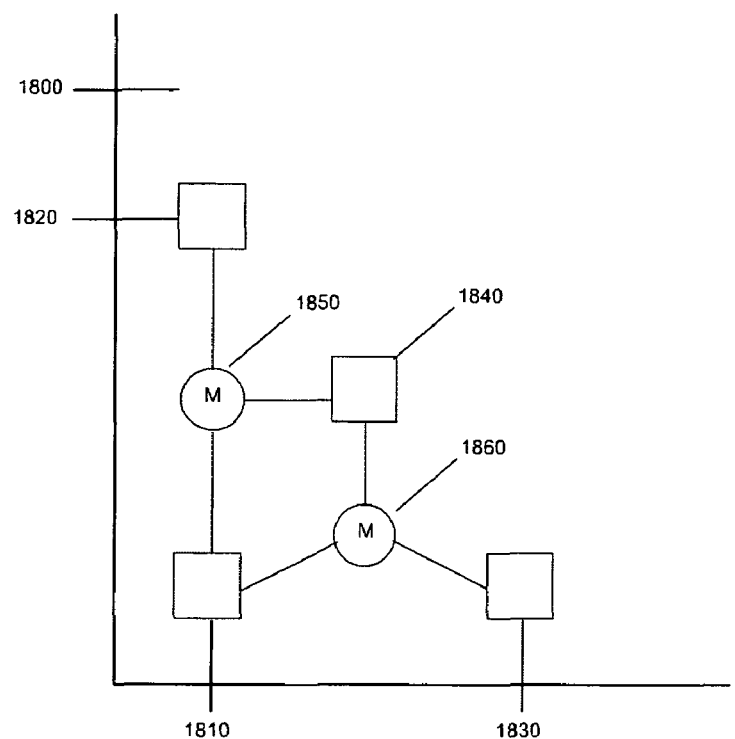
FIG. 18 is a schematic diagram showing the integration of memory modules in a 3D SoC neighborhood cluster of IC nodes.

FIG. 18 shows the integration of memory modules in a 3D SoC (1800) neighborhood cluster of IC nodes. The multilayer hybrid logic devices (1810, 1820, 1830 and 1840) interact with multilayer memory modules (1850 and 1860).

Figure 19:
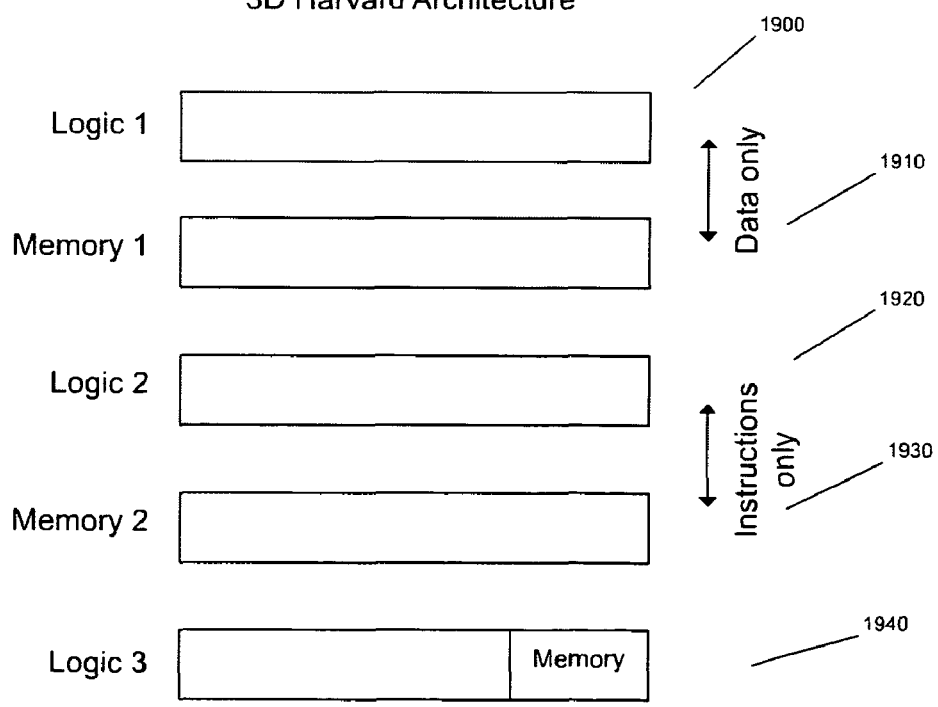
FIG. 19 is a schematic diagram showing the Harvard architecture configuration in a 3D multilayer IC node.

FIG. 19 shows the Harvard architecture configuration in a 3D multilayer IC node. Logic layer 1 (1900) interacts with memory layer 1 (1910) by storing and accessing only data. Logic layer 2 (1920) interacts with memory layer 2 (1930) by storing and accessing only instructions. Logic layer 3 has its own memory components (1940).

Figure 20:
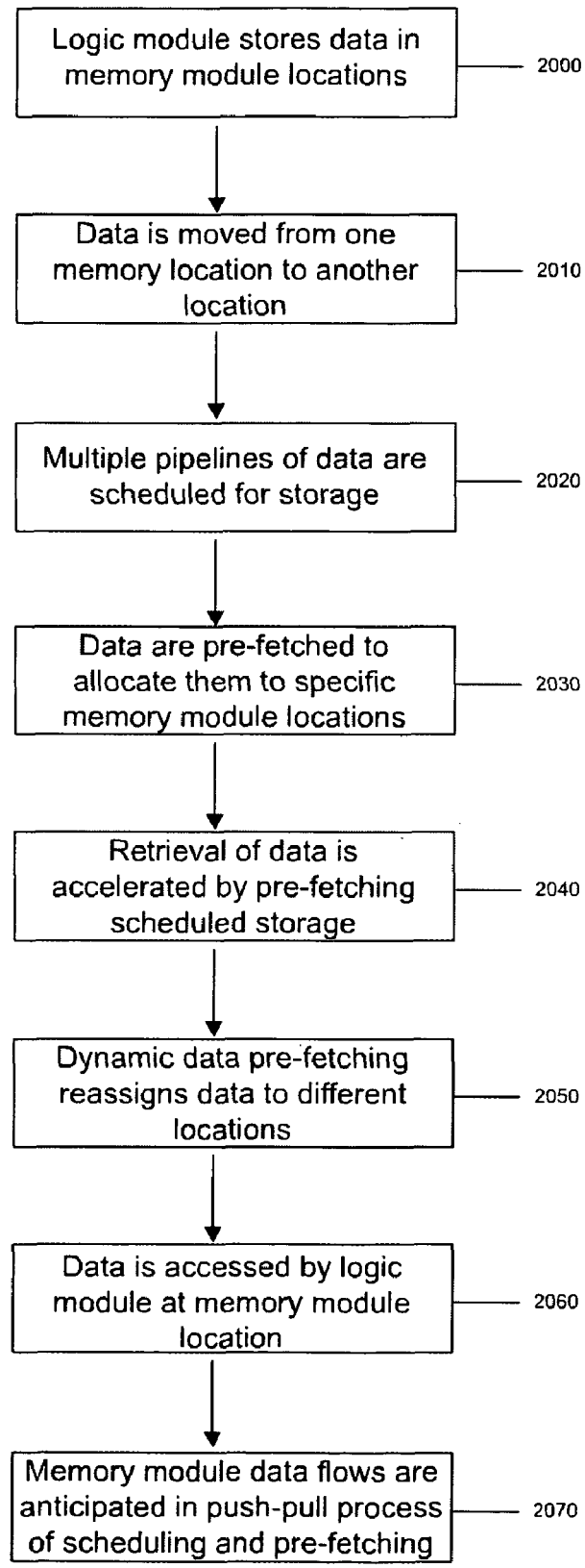
FIG. 20 is a flow chart describing the flow of data using pre-fetching using multiple pipelines in a multilayer IC in a SoC.

FIG. 20 is a flow chart describing the flow of data using pre-fetching using multiple pipelines in a multilayer IC in a SoC. Once the logic module stores data in memory module locations (2000), the data is moved from one memory location to another location (2010). Multiple pipelines of data are scheduled for storage (2020). Data are pre-fetched to allocate them to specific memory module locations (2030). Retrieval of data is accelerated by pre-fetching scheduled storage (2040) and dynamic data pre-fetching reassigns data to different locations (2050). Data is accessed by a logic module at the memory module location (2060) and the memory module data flows are anticipated in a push-pull process of scheduling and pre-fetching (2070).

Figure 21:
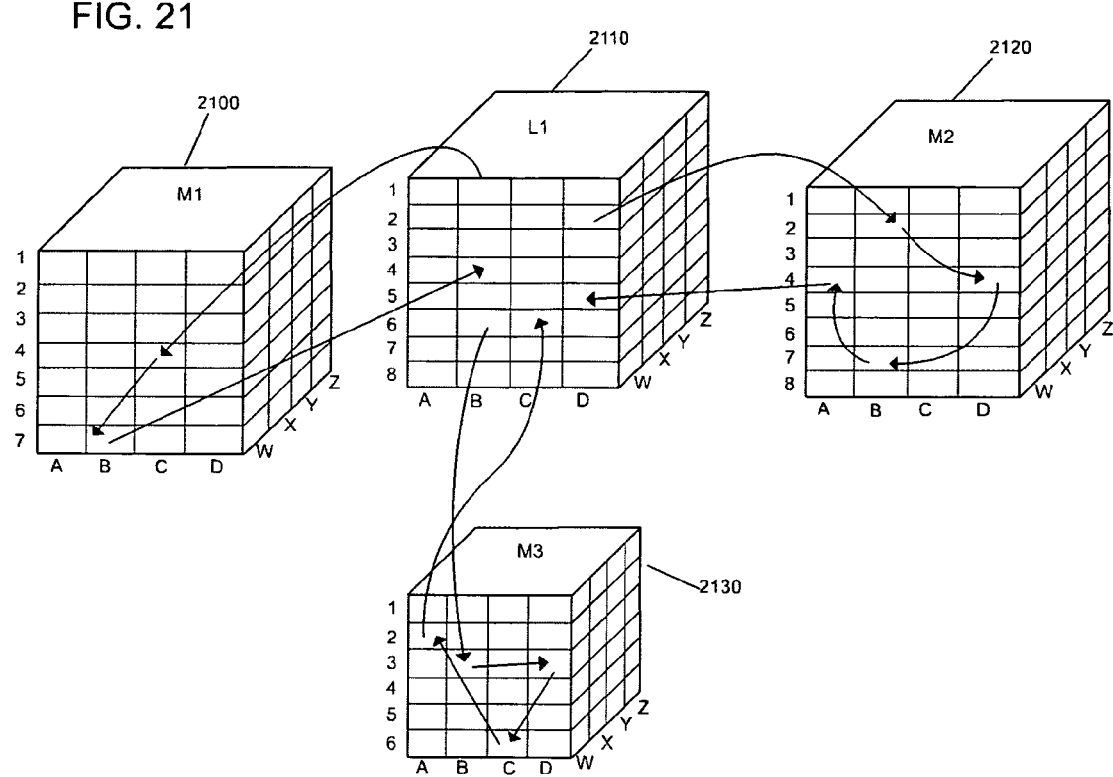
FIG. 21 is a schematic diagram showing the continuously reassigned memory that is scheduled and pre-fetched in 3D modules.

FIG. 21 shows the continuously reassigned memory that is scheduled and pre-fetched in 3D modules. Data are scheduled to be stored from L1 (2110) tile B1 to M1 C4 and B7. Data are then accessed by L1 B4 from M1 B7. Similarly, data are scheduled to be stored from L1 tile D2 to module M2 (2120) B2, D4, B7 and A4. The data are accessed by L1 D5. Finally, data are scheduled to be stored from L1 tile B6 to M3 (2130) M3, D3, C6 and A2. The data are accessed by L1 C6. This process allows data to be relocated during transformation processes, while the storage process is tracked and the data scheduled and pre-fetched from multiple multilayer memory modules. Note the third access of the 3D nodes that allow for an additional dimension of specificity for the storage of data on tiles in the multilayer memory modules.

Figure 22:
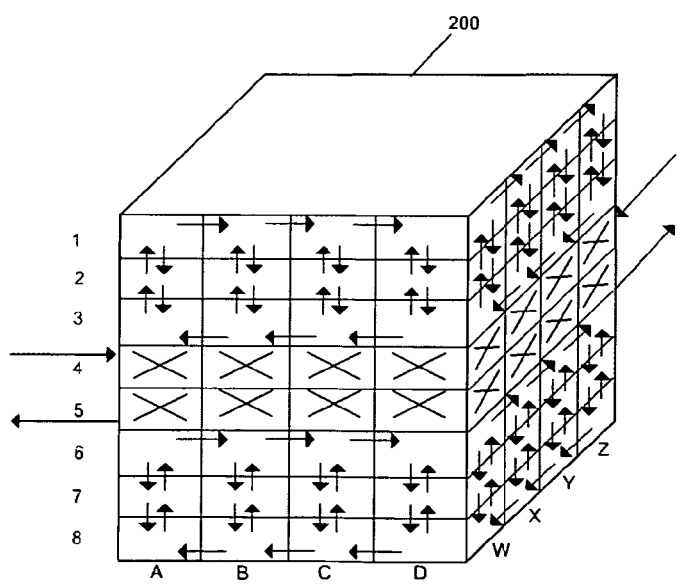
FIG. 22 is a schematic diagram showing the use of layers 4 and 5 as queues for reordering data sets in a multilayer IC.
Figure 23:
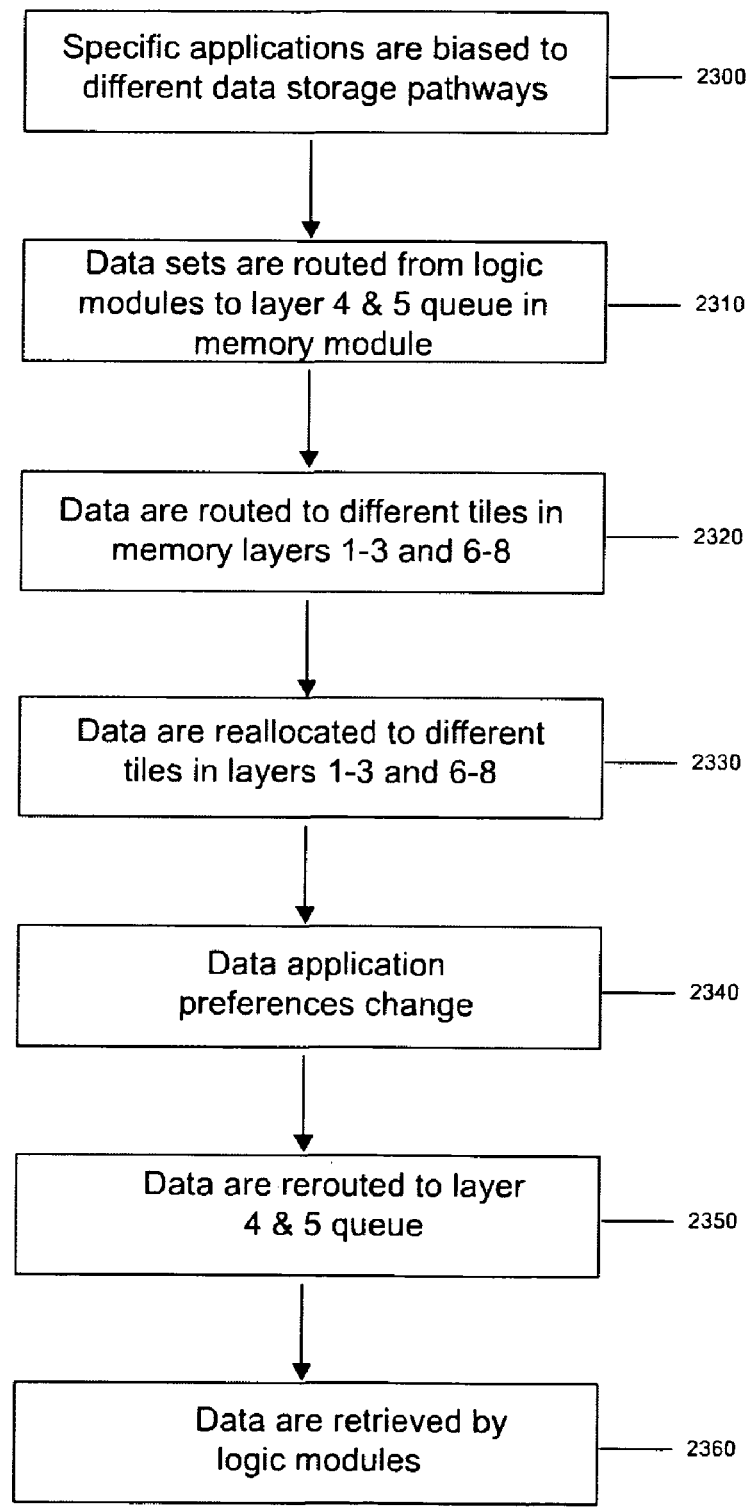
FIG. 23 is a flow chart showing the adaptive queue processing model.

FIG. 22 shows the use of layers 4 and 5 as queues for reordering data sets in a multilayer IC. As data moves around the multilayer memory module (200), layers 4 and 5 act as queues by interacting with both the internal device layers (1-3 and 6-8) and external components and devices. FIG. 23 describes the organizational dynamics of this process.

FIG. 23 is a flow chart showing the adaptive queue processing model. After the specific applications are biased to different data storage pathways (2300), data sets are routed from logic modules to layer 4 and 5 queues in the memory module (2310). Data are then routed to different tiles in memory layers 1-3 and 6-8 (2320) and are reallocated to different tiles in these layers (2330). As the data application preferences change (2340), data are rerouted to layer 4 and 5 queue (2350) and retrieved by logic modules (2360).

Figure 24:
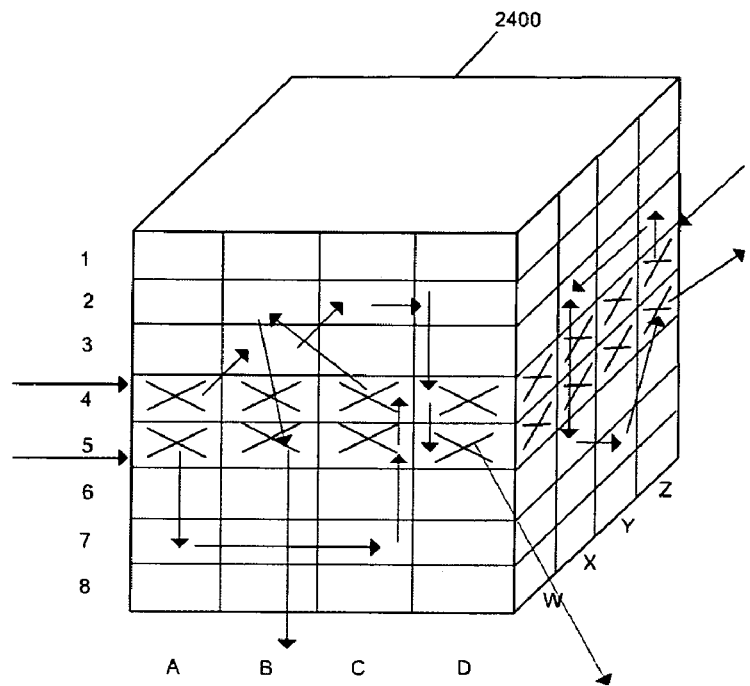
FIG. 24 is a schematic diagram showing the adaptive queue process as not a FIFO.

FIG. 24 shows the circulation of data between modules in a iSoC in which data is offloaded for low priority storage. This adaptive queue process does not use a FIFO. As data sets are repositioned in the 3D memory module, they are routed to the central queue layers. When the priority of the data diminishes, the data are off-loaded to external memory devices for long term storage. Similarly, data sets are input into the queue layers from external sources in order to be internally routed, and rerouted, to tiles on various layers of the multilayer memory module. The data are not routed in the order received, but rather receive a priority of order that is constantly updated. See also FIG. 30.

Figure 25:
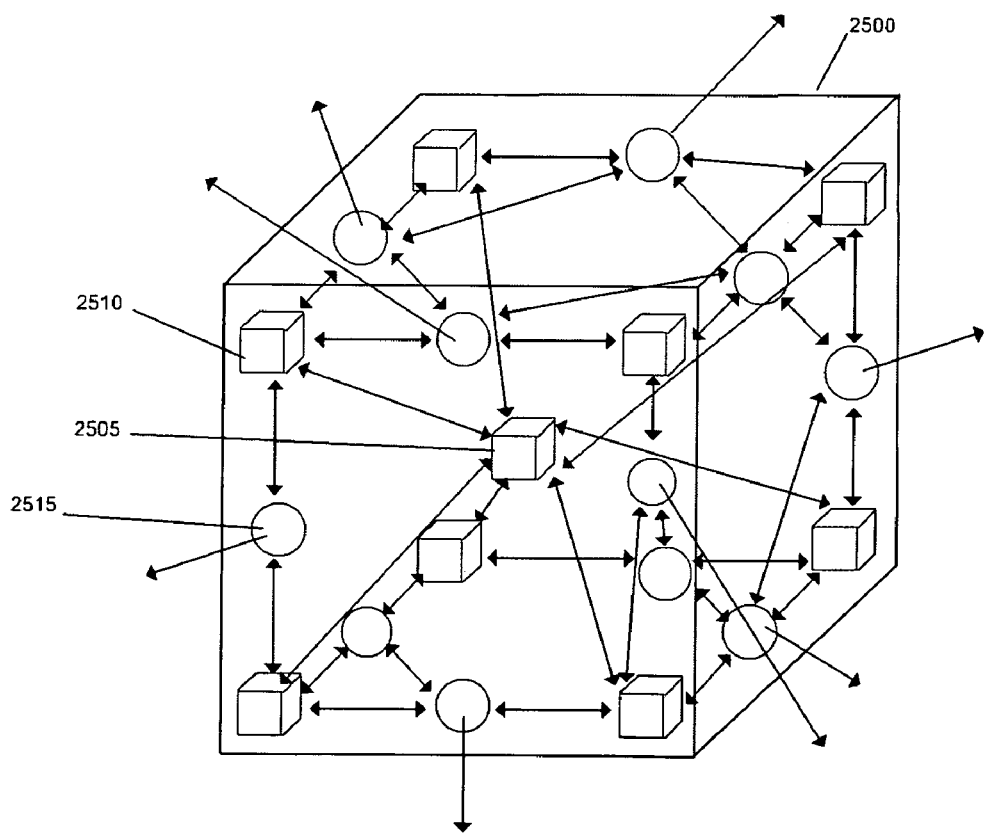
FIG. 25 is a schematic diagram showing the circulation of data between modules in a iSoC in which data is offloaded for low priority storage.

FIG. 25 shows the circulation of data between modules in a iSoC in which data is offloaded for low priority storage. The cubic modules (2510) in the corners are the multilayer hybrid logic devices, while the circles (2515) are the multilayer hybrid memory devices. Data are passed between the logic and memory devices. Lower priority data are sent to longer term storage devices outside of the 3D iSoC.

Figure 26:
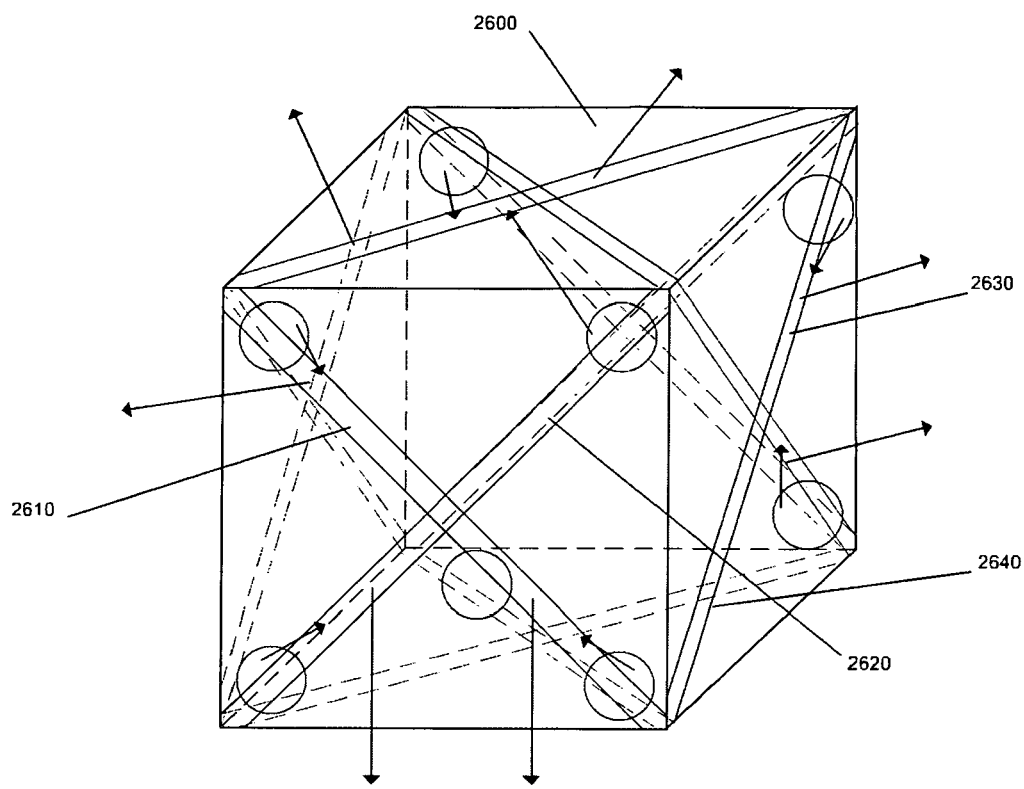
FIG. 26 is a schematic diagram showing the use of memory in sleeves to off-port low priority data.

FIG. 26 shows the use of memory in sleeves to off-port low priority data. The crossbars (2610, 2620, 2630 and 2630), indicated here on two façades of the 3D iSoC (2610) are used for additional storage capabilities. Data are sent to these crossbars on the outside edges of the iSoC package as an intermediate destination before off-loading to external memory devices.

Figure 27:
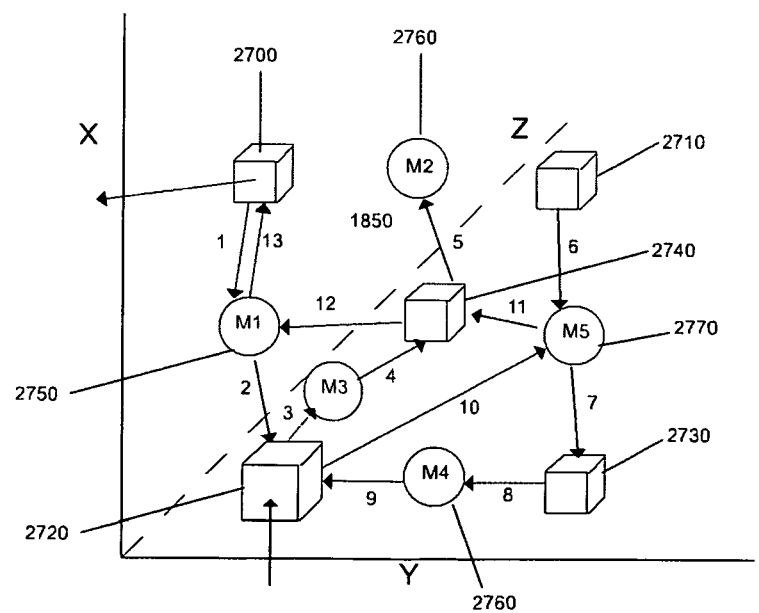
FIG. 27 is a schematic diagram showing the different sequential prioritization of data in memory modules.

FIG. 27 shows the different sequential prioritization of data in memory modules. The drawing shows five multilayer hybrid logic nodes and five multilayer hybrid memory nodes in a 3D iSoC neighborhood configuration. Data are routed from 2700 to 2750 to 2720 to 2715 to 2740 to 2760. Data are then routed from 2710 to 2770 to 2730 to 2760 to 2720 to 2770 to 2740 to 2750 to 2700 and finally to locations off-site.

Figure 28:
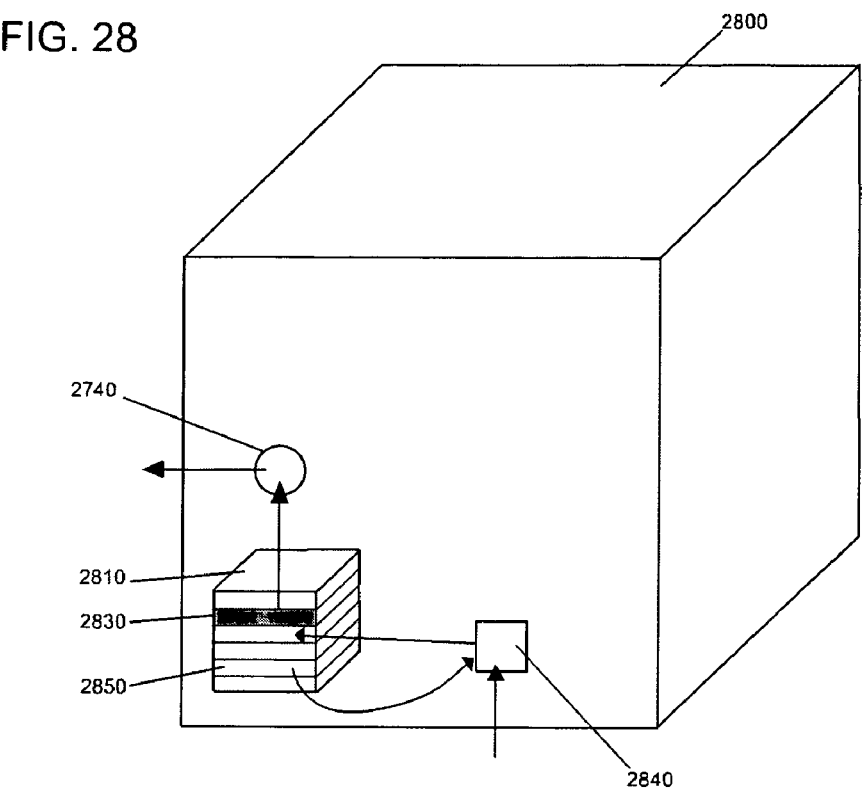
FIG. 28 is a schematic diagram showing the interaction of on board multilayer IC memory layers with memory nodes and with external memory in a 3D SoC.

FIG. 28 shows the interaction of on-board multilayer IC memory layers with memory nodes and with external memory in a 3D SoC. Data are sent from external sources to a node (2840) in the 3D iSoC and then to layer 2 (2830) of the node at 2810. Data are sent from layer 2 of 2810 to a memory node (2740), which then sends the data to an external device. At the same time, data is sent from the layer at 2850 to the node at 2840.

Figure 29:
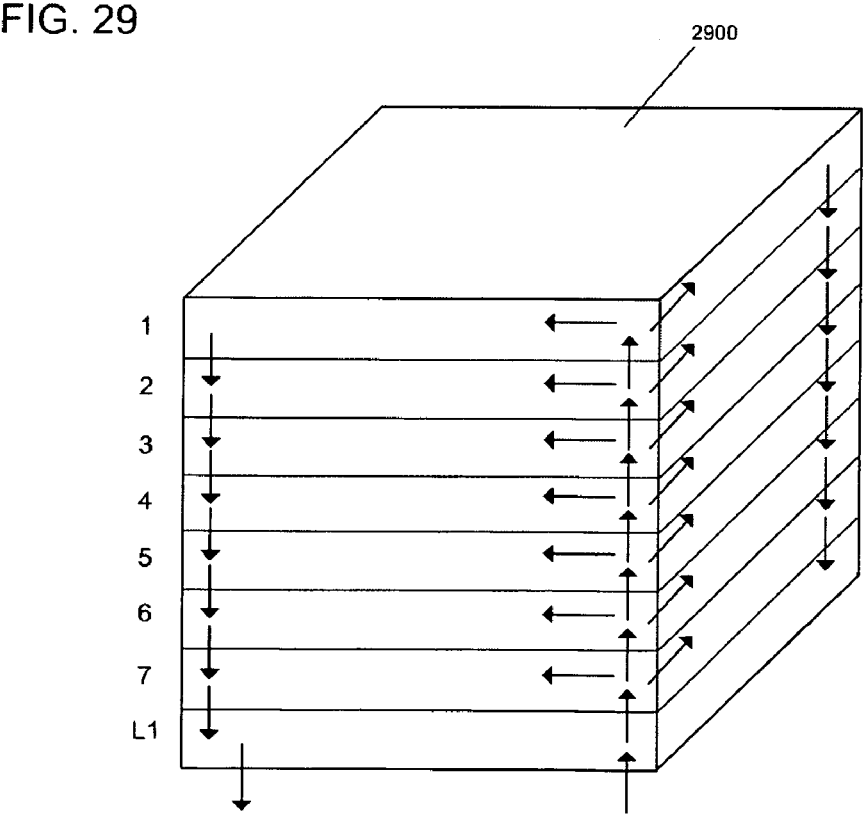
FIG. 29 is a schematic diagram showing an active 3D memory module with a logic layer.

FIG. 29 shows an active 3D memory module with a logic layer. The logic layer, at layer 8, controls the seven memory layers. Data enters, and departs, the memory module at the logic layer, which acts as a router.

Figure 30:
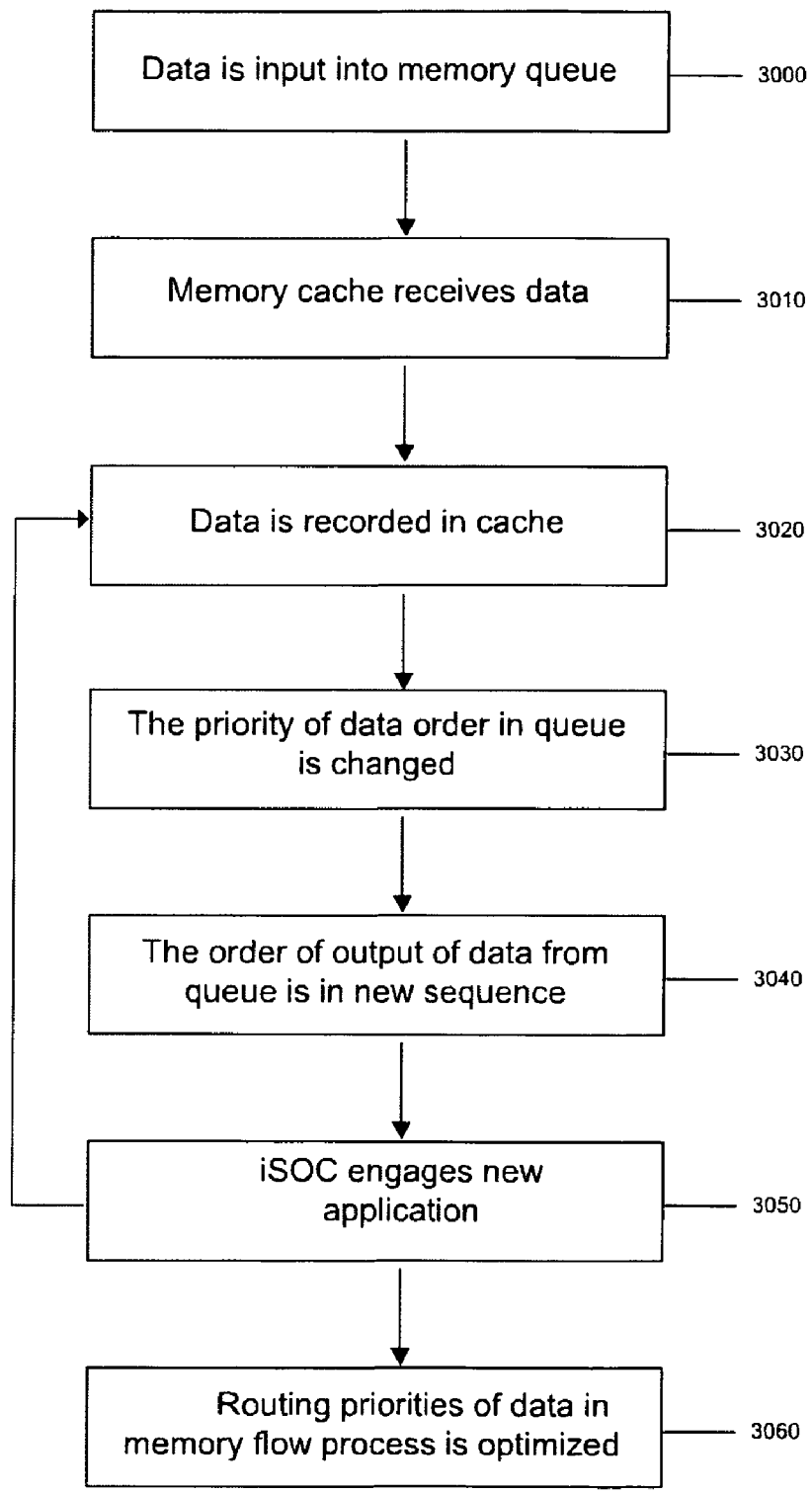
FIG. 30 is a flow chart showing the process of reordering data between memory components in a 3D iSoC.

FIG. 30 is a flow chart that shows the process of reordering data between memory components in a 3D iSoC. Once data is input into a memory queue (3000), a memory cache receives data (3010) and data is recorded in the cache (3020). The priority of data order in the queue is changed (3030) and the order of output of data from the queue is in a new sequence (3040). After the iSoC engages a new application (3050), the data is once again recorded in the cache, the priority of data order changed and the order of output ordered in a new sequence, a process that repeats until the routing priorities of data in the memory flow process is optimized (3060).

Figure 31:
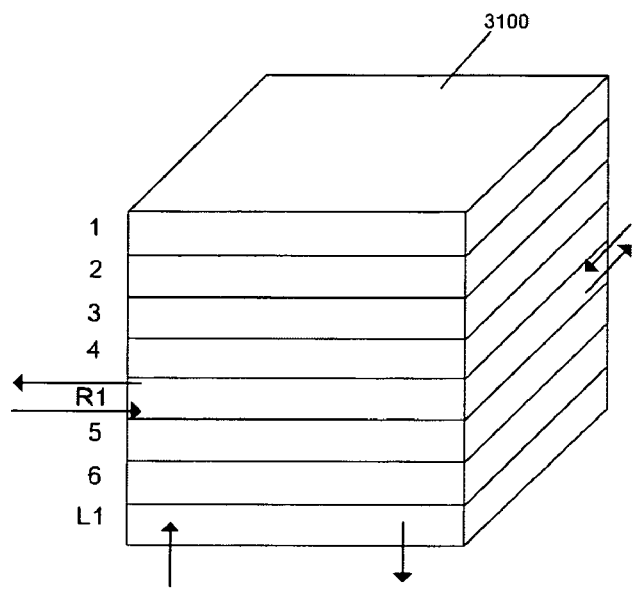
FIG. 31 is a schematic diagram showing a router on a layer of a multilayer IC.

FIG. 31 shows a router on a layer of a multilayer IC. The router (R1) transfers data from external devices to the multilayer memory module. Data are imported both through the router and through the logic layer. Data are also transferred from the memory module to external devices from the router and the logic layer.

Figure 32:
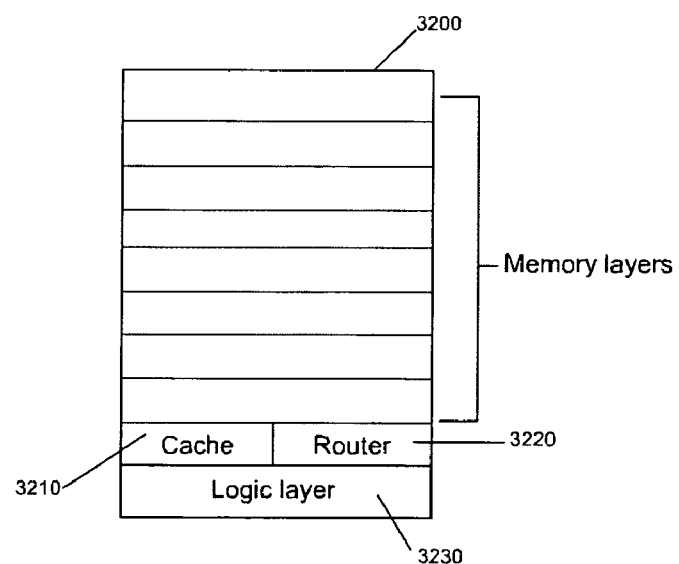
FIG. 32 is a schematic diagram showing an active 3D memory module with a logic layer and a layer for cache and router.

FIG. 32 shows an active 3D memory module with a logic layer and a layer for cache and router. The first eight layers in the drawing show the memory layers. The cache (3210) and router (3220) are on the ninth layer. The logic layer (3230) is on the tenth layer.

Figure 33:
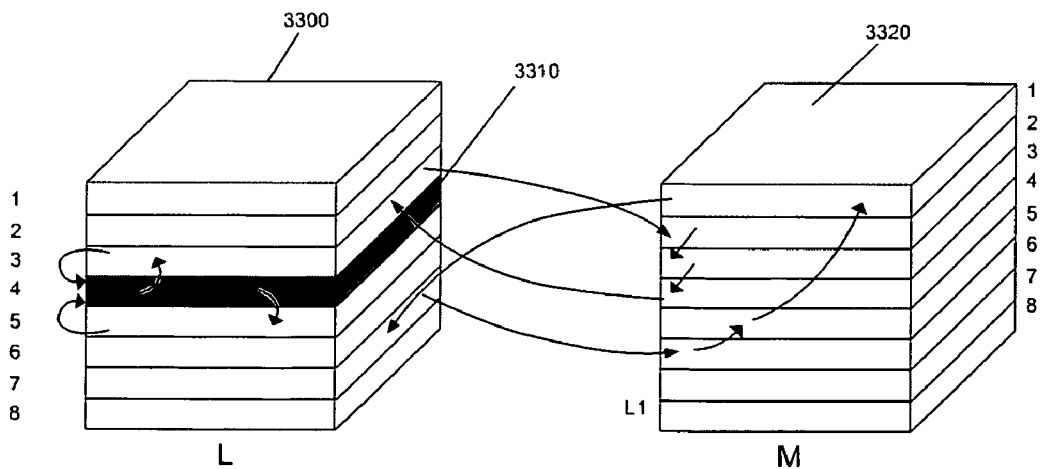
FIG. 33 is a schematic diagram showing stream processing with multiple parallel caching to process multiple data streams between a multilayer logic IC and a multilayer memory IC.

FIG. 33 shows stream processing with multiple parallel caching to process multiple data streams between a multilayer logic IC (3300) and a multilayer memory IC (3320). In the logic module, data streams are input into the fourth layer, which is highlighted, and used for caching. The fourth layer receives data streams from other layers in the logic IC and forwards data streams to other layers in the logic IC. In addition, data streams are forwarded from various layers (3 and 7 in the figure) to different memory layers in the memory module. Data streams are moved from location to location on various layers of the memory module. Data are accessed by request from the logic module and forwarded to different layers of the logic module (3 and 7 in the figure). In this way, the memory module provides integrated memory capability to the logic module.

Figure 34:
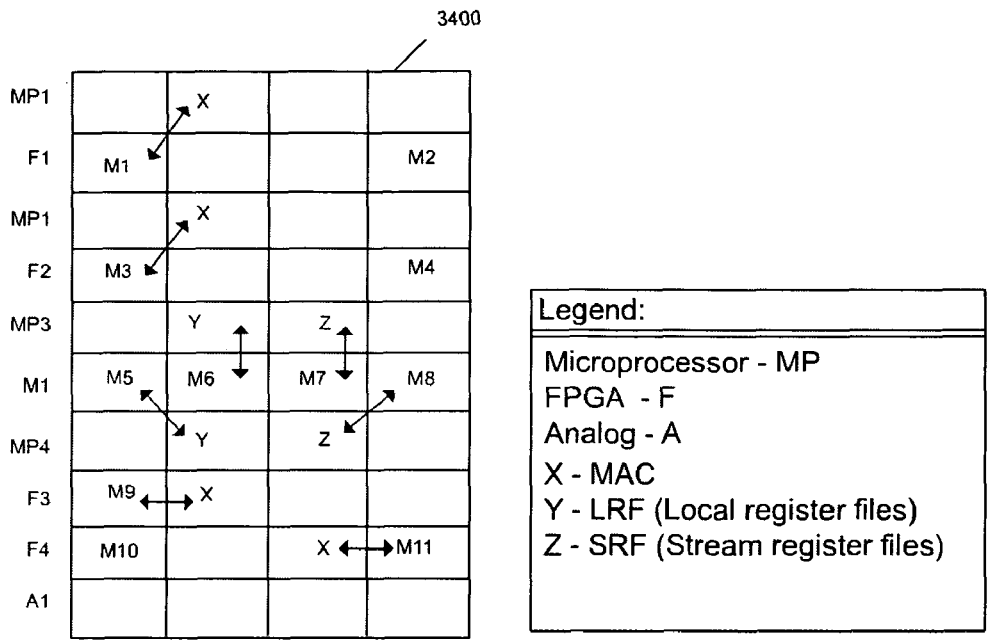
FIG. 34 is a schematic diagram showing stream processing within a multilayer logic node.

FIG. 34 shows stream processing in a multilayer logic node. In the drawing, a ten layer hybrid logic module consists of microprocessors (1, 2, 3 and 4 on layers 1, 3, 5 and 7, respectively) and FPGAs (1, 2, 3 and 4 on layers 2, 4, 8 and 9, respectively). On the outside edges of the FPGA layers are memory tiles for SRAM shown as M1, M2, M3, M4, M9, M10 and M11. The analog layer is shown at layer 10. The tiles designated by an X have a MAC device, those designated by a Y have an LRF and those designated by a Z have an SRF. Data sets move from the tiles designated by an X, Y and Z to the nearest memory tiles for storage and retrieval. The memory layer is strategically located for access by two microprocessor layers. The top two microprocessor layers use the memory tiles of the top two FPGAs. The bottom two FPGAs use memory tiles on their own layers. This schema for use of memory tiles by logic tiles is only an example of the system since multiple permutations of this model are provided here.

Figure 35:
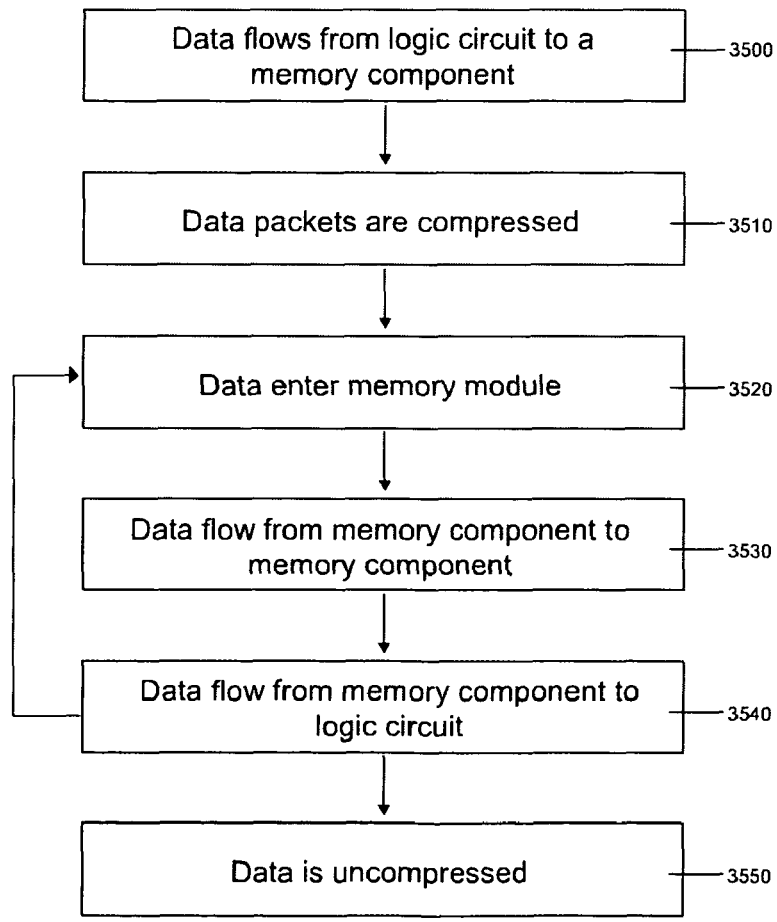
FIG. 35 is a flow chart describing the process of data flows between memory and logic components of multilayer ICs.

FIG. 35 is a flow chart describing the process of data flows between memory and logic components of multilayer ICs. After data flows from logic circuit to a memory component (3500), the data packets are compressed (3510) and data enter the memory module (3520). Data then flow from memory component to memory component (3530) and data flow from memory component to logic circuit (3540). As data enter the memory module they are continuously routed to the memory and logic components. Once data are received at the logic circuit, the data are uncompressed (3550).

Figure 36:
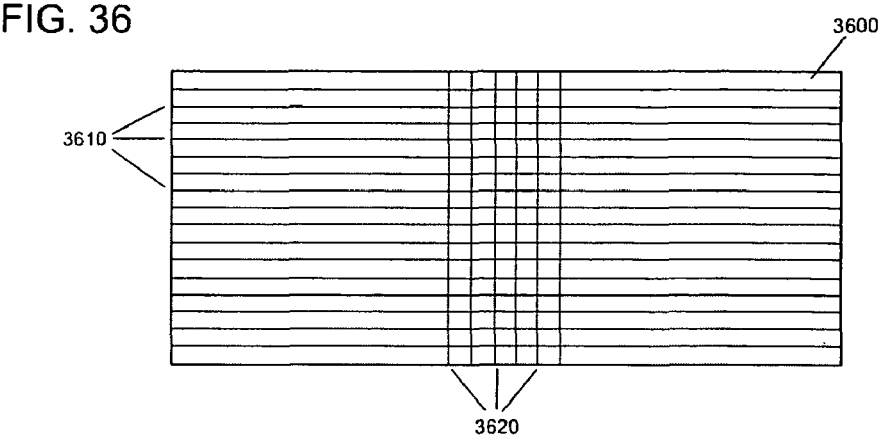
FIG. 36 is a schematic diagram showing DRAM and SRAM rows on a layer of a multilayer memory IC.
Figure 37:
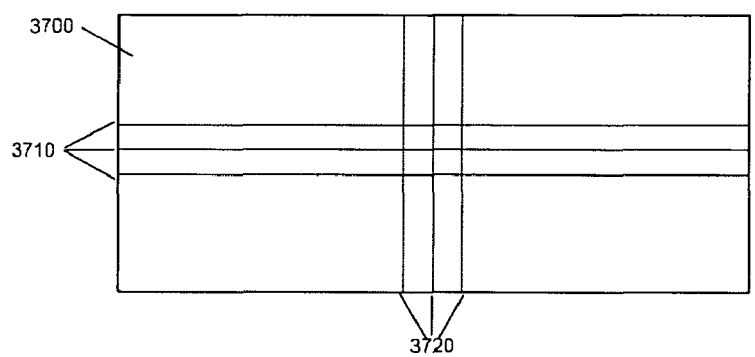
FIG. 37 is a schematic diagram showing an SRAM grid integrated into a DRAM layer of a multilayer IC.

FIG. 36 shows DRAM and SRAM rows on a layer of a multilayer memory IC (3600). The DRAM horizontal rows (3610) are overlaid by SRAM rows (3620). Though this drawing overlays SRAM rows over perpendicular DRAM rows, multiple alternative memory types may be used. FIG. 37 shows an SRAM grid integrated into a DRAM layer of a multilayer IC. Rows of different memory types are shown at 3710 and 3720. These rows are SRAM and DRAM memory types, but may be different memory types. Further, these rows may be integrated into a memory layer or a logic layer in a 3D integrated circuit.

Figure 38:
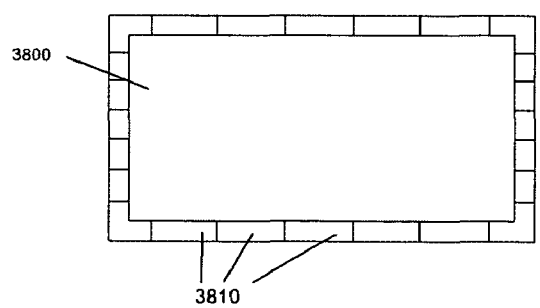
FIG. 38 is a schematic diagram showing the outside rows of tiles with SRAM blocks, accessed by TSVs and interconnects, within an FPGA layer of a multilayer IC.
Figure 39:
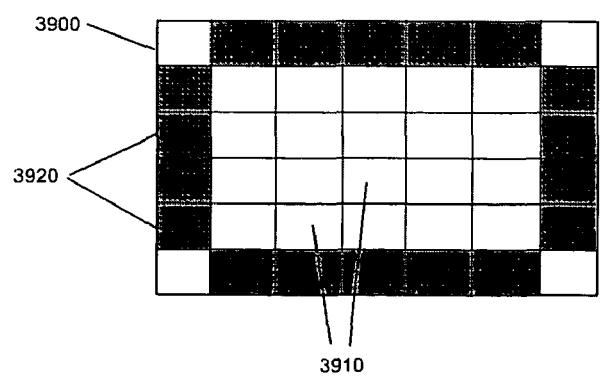
FIG. 39 is a schematic diagram showing a view of outside rows of SRAM blocks on tiles in a integrated memory layer with DRAM blocks in which access to the DRAM blocks is made in the corners of the layer.
Figure 40:
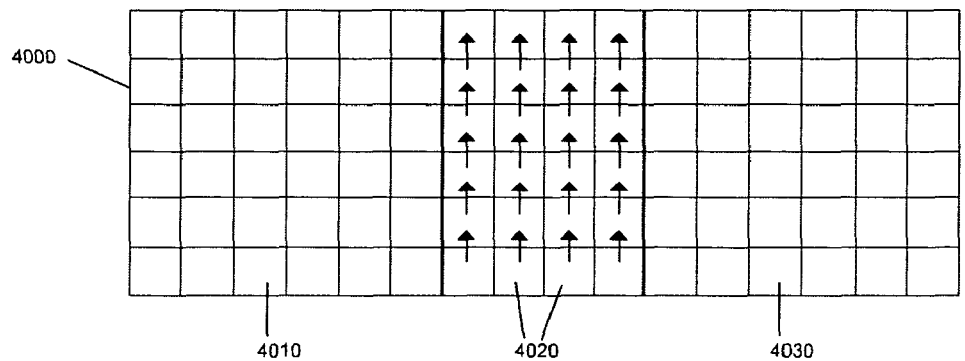
FIG. 40 is a schematic diagram showing a center region of asynchronous DRAM on a layer of tiles in a multilayer IC.

FIG. 38 shows the outside rows of tiles (3810) with SRAM blocks, accessed by TSVs and interconnects, within an FPGA layer (3800) of a multilayer IC. FIG. 39 shows a view of the outside rows of SRAM blocks (3920) on tiles in an integrated memory layer with DRAM blocks (3910) in which access to the DRAM blocks is made in the corners of the layers (3900). FIG. 40 shows a center region of asynchronous DRAM (4020) on a layer of tiles in a multilayer IC.

Figure 41:
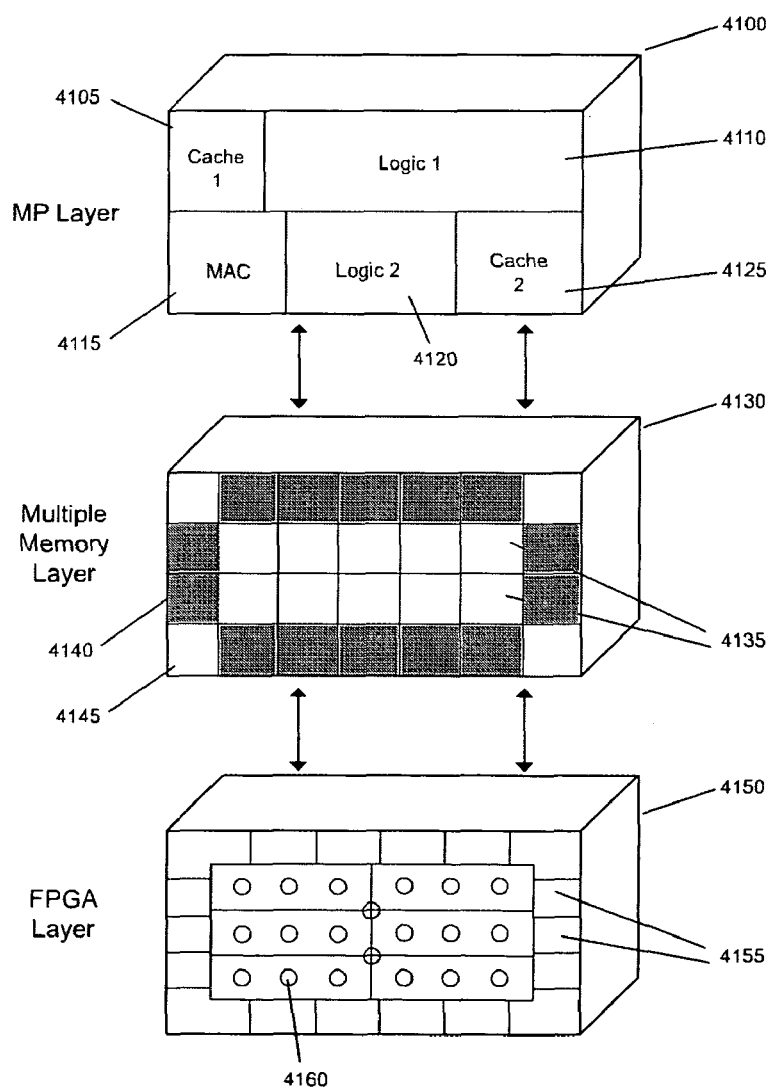
FIG. 41 is a schematic diagram showing the connection between three layers in an integrated memory system with multiple memory types.

FIG. 41 shows the connection between three layers in an integrated memory system with multiple memory types. The first layer, the microprocessor layer (4100), contains two memory caches (4105 and 4125) for its logic (4110, 4120) and MAC (4115) components. The second layer, the multiple memory layer (4130), contains different types of memory for different logic circuits, including the SRAM tiles (4140) on the outside edges and the DRAM tiles (4135) on the inside. The FPGA layer (4150) contains SRAM blocks on the outside edges (4155) to facilitate access to LUTs by the logic array blocks (4160). The memory layer is sandwiched between the two different types of logic circuits. The microprocessor accesses the DRAM on the interior and corner tiles, while the FPGA accesses the outer SRAM tiles. Though both logic layers have on-board memory components, they are supplemented by different types of memory components in the memory layer.

Figure 42:
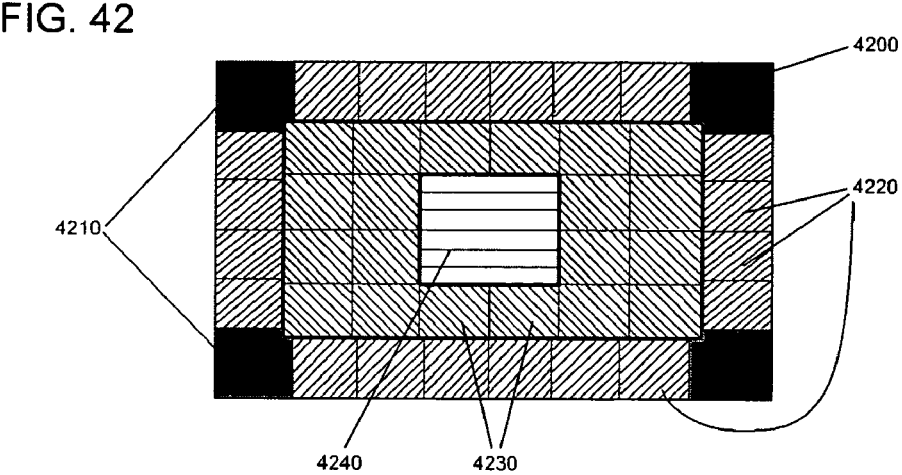
FIG. 42 is a schematic diagram showing a multi-memory layer with three tiers of memory types, in which the outer layer features faster data access and nearer term access, in a nested hierarchical configuration.

FIG. 42 shows a multi-memory layer with three tiers of memory types, in which the outer layer features faster data access and nearer term access, in a nested hierarchical configuration. The outer layer contains fast-access memory (4220), while the middle section contains memory types that provide medium-speed storage (4230). The corners (4210) have memory types that are either very fast or medium speed. The interior section (4240) has the slowest memory types. This hierarchical model is useful for balancing the memory load in different types of logic application that require multiple tiers of memory capability.

Figure 43:
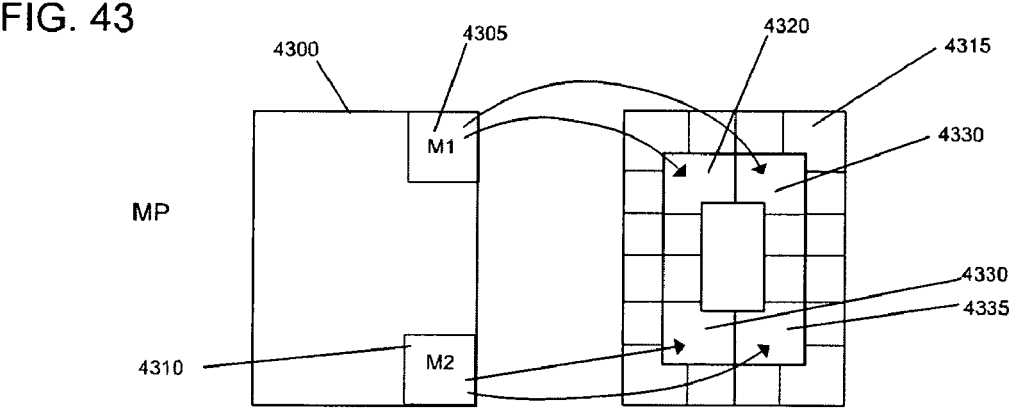
FIG. 43 is a schematic diagram showing the process of interaction of multilayer ICs with dynamic memory hierarchies of multiple memory types and layers with different priorities and different sources.
Figure 43:
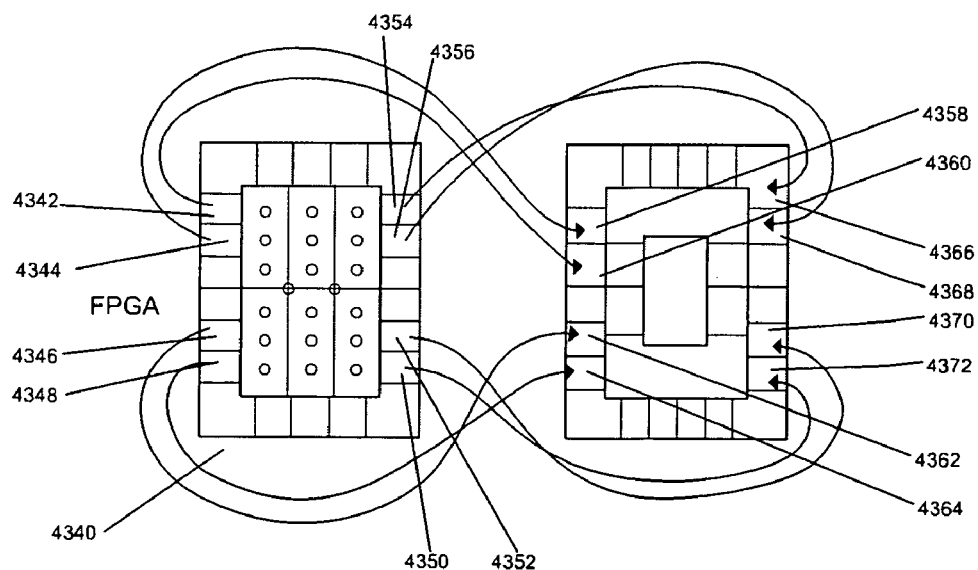

FIG. 43 shows the process of interaction of multilayer ICs with dynamic memory hierarchies of multiple memory types and layers with different priorities and different sources. In the top drawing, the microprocessor memory tiles (4305 and 4310) forward data to the inner memory tiles (4320, 4330, 4330 and 4335) of the multi-memory layer for storage. In the bottom drawing, the FPGA memory tiles (4342, 4344, 4354, 4356, 4346, 4348, 4350 and 4352) forward data to the memory tiles on the outer edges (4358, 4360, 4362, 4364, 4366, 4368, 4370 and 4372) of the multi-memory module.

Figure 44:
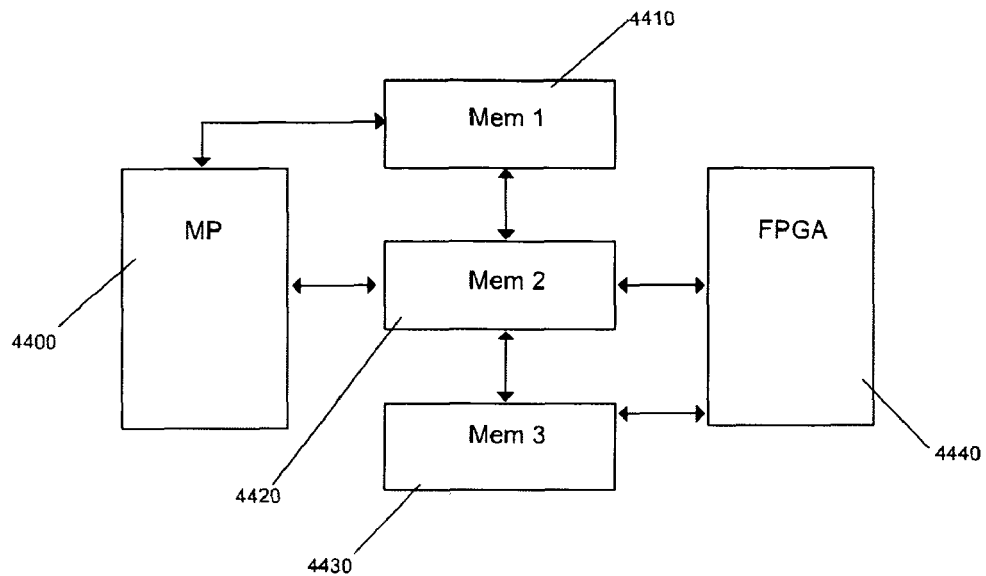
FIG. 44 is a block diagram showing the parallel use of memory hierarchy by a multiprocessor and an FPGA.

FIG. 44 shows the parallel use of memory hierarchy by a multiprocessor and an FPGA. The first (4410) and second (4420) memory types interact with the multiprocessor (4400) and the second and third memory types (4430) interact with the FPGA (4440). The multi-memory layer allows the multiple parallel use of memory storage and access by multiple types of logic components simultaneously.

Figure 45:
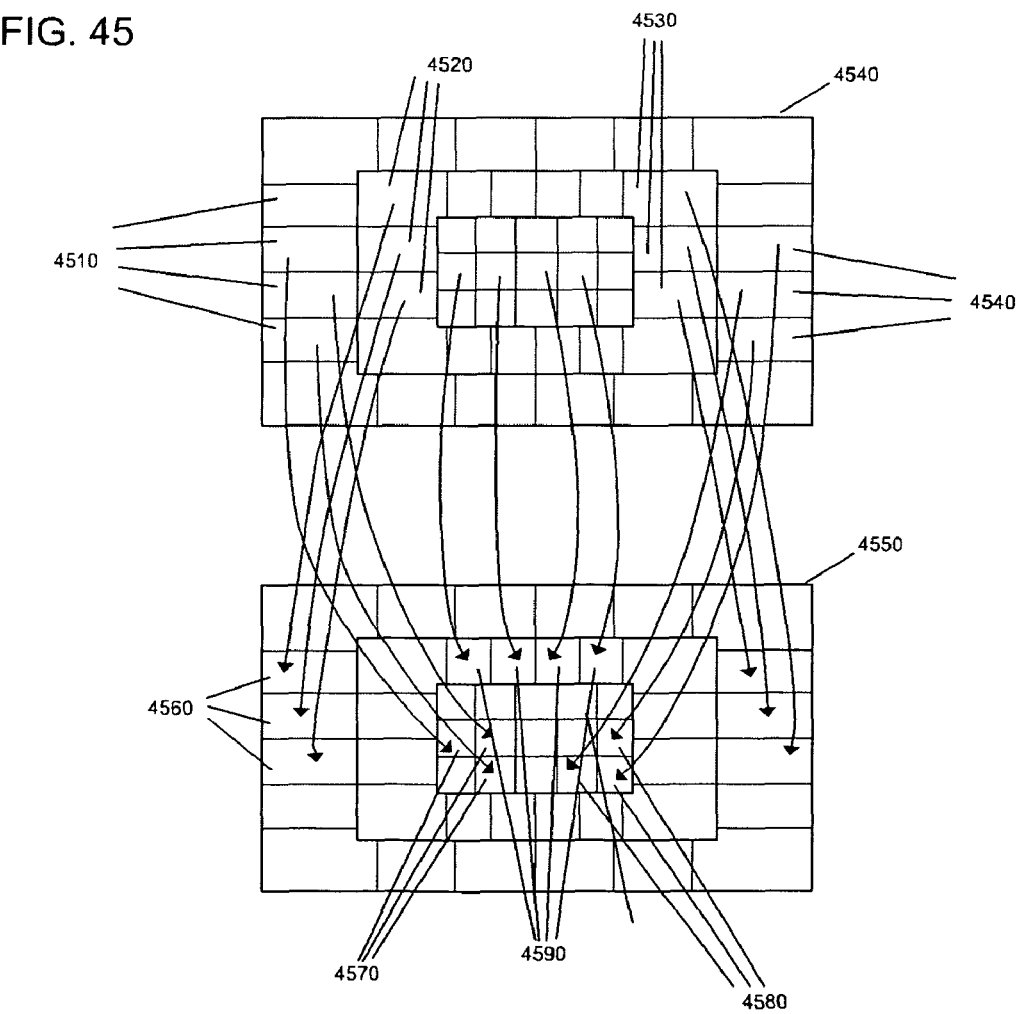
FIG. 45 is a schematic diagram showing the repositioning from one configuration to another by passing memory contents to another memory type in two memory layers of a 3D multilayer SoC.

FIG. 45 shows the repositioning from one configuration to another by passing memory contents to another memory type in two memory layers of a 3D multilayer SoC. Data are transferred from the memory type at the outer edges (4510 and 4540) of the first multi-memory layer (4540) to the memory at the inner section (4570 and 4580) of the second multi-memory layer (4550). At the same time, data is transferred from the tiles in the middle section (4520 and 4530) of the first multi-memory module to tiles on the outer layer (4560) of the second multi-memory module. Finally, data is transferred from tiles on the innermost section of the first module to tiles on the middle section (4590) of the second module.

Figure 46:
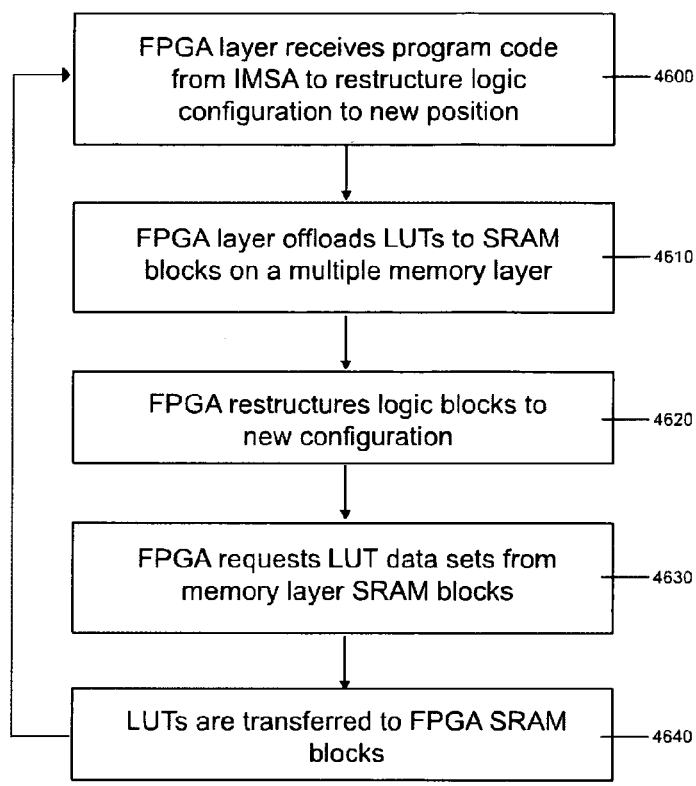
FIG. 46 is a flow chart describing the process of an FPGA accessing memory components in a multilayer IC.

FIG. 46 is a flow chart describing the process of an FPGA accessing memory components in a multilayer IC. The FPGA layer receives program code from an IMSA to restructure its logic interconnect geometric configuration to a new position (4600) and then off-loads the contents of LUTs to SRAM blocks on a multiple memory layer (4610). The FPGA restructures its logic block arrays to a new configuration (4620) and requests LUT data sets from memory layer SRAM blocks (4630). The LUTs are then transferred to FPGA SRAM tiles (4640) and the process repeats.

Figure 47:
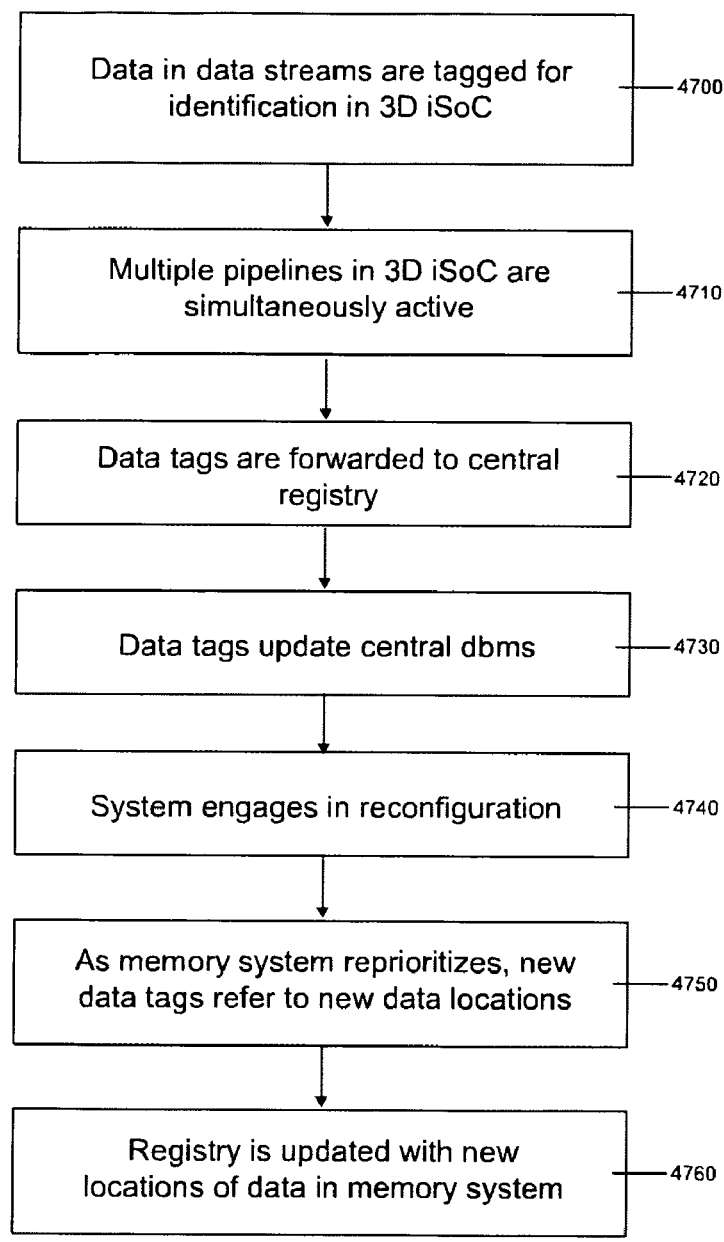
FIG. 47 is a flow chart describing the process of using data tags to track data in a memory system within a 3D SoC.

FIG. 47 is a flow chart describing the process of using data tags to track data in a memory system within a 3D SoC. After data in data streams are tagged for identification in 3D iSoC (4700), multiple pipelines in the iSoC are simultaneously active (4710). Data tags are forwarded to a central registry (4720) and update a central dbms (4730). The system engages in a reconfiguration (4740) and as the memory system reprioritizes, new data tags refer to new data locations (4750). The registry is updated with new locations of data in the memory system (4760). This process is important for tracking the circulation of data in the iSoC.

Figure 48:
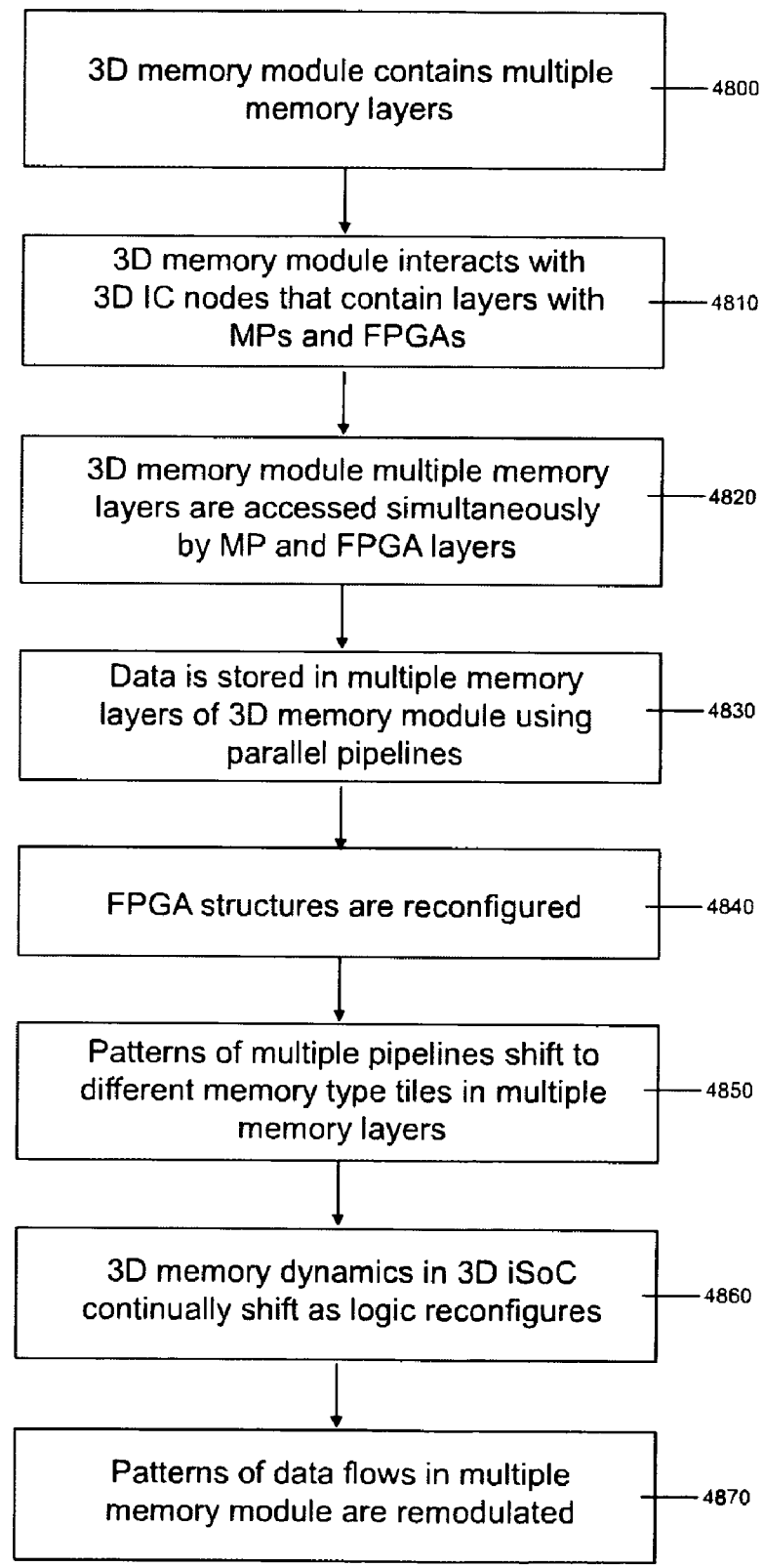
FIG. 48 is a flow chart showing the dynamics of memory reorganization in 3D memory within a 3D SoC.

FIG. 48 is a flow chart showing the dynamics of memory reorganization in 3D memory within a 3D SoC. The 3D memory module contains multiple memory layers (4800) and interacts with the 3D IC nodes that contain layers with microprocessors and FPGAs (4810). Components in the 3D memory module multiple memory layers are accessed simultaneously by MP and FPGA layers (4820) and data is stored in multiple memory layers of 3D memory module using parallel pipelines (4830). The FPGA structures are reconfigured (4840) and patterns of multiple pipelines shift to different memory type tiles in multiple memory layers (4850). The 3D memory dynamics in the 3D iSoC continually shift as the logic reconfigures (4860). The patterns of data flows in the multiple memory module are then remodulated (4870).

Figure 49:
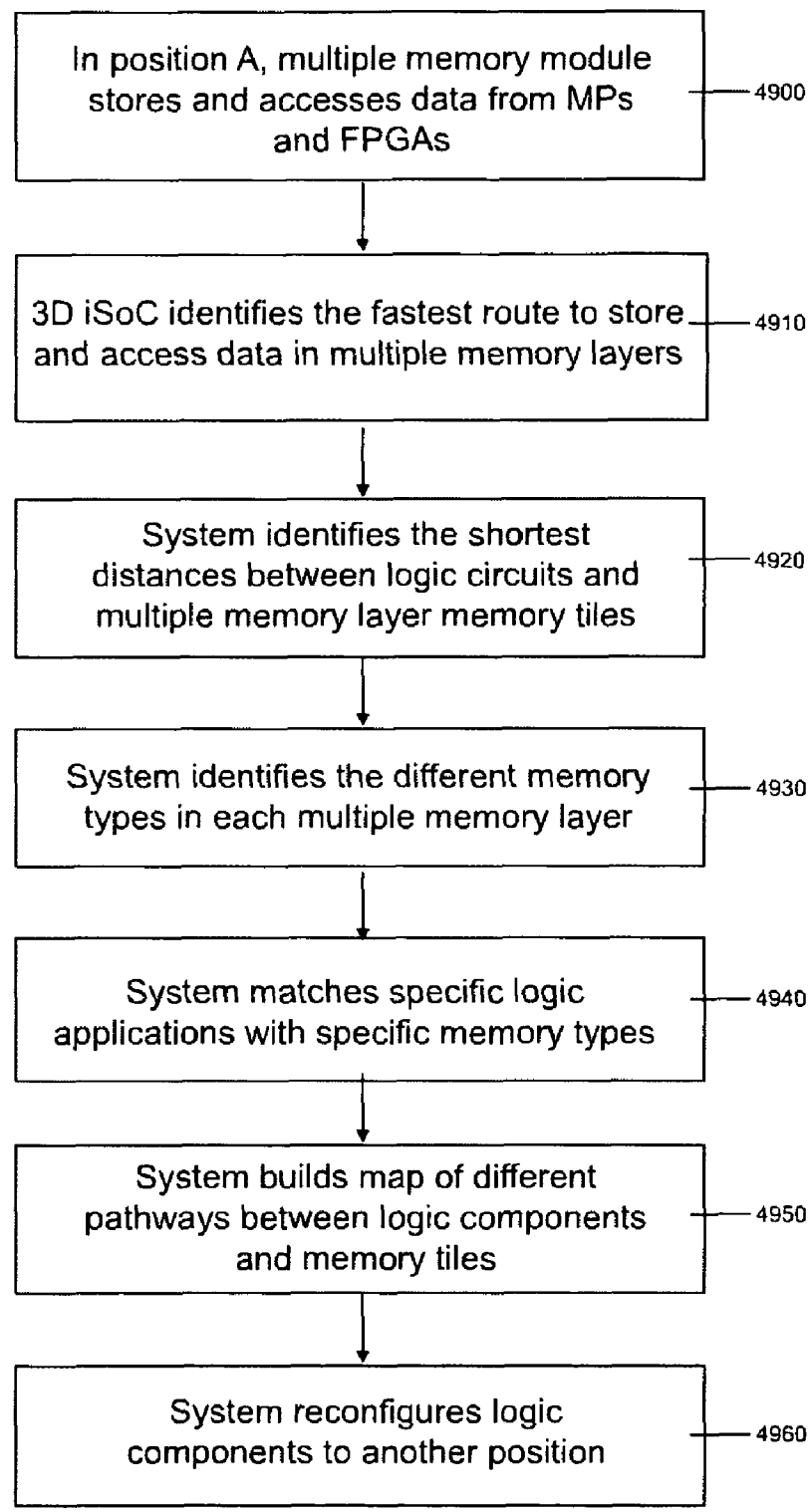
FIG. 49 is a flow chart showing the process of organizing data pathways between logic and memory layers of 3D ICs in a 3D SoC.

FIG. 49 is a flow chart showing the process of organizing data pathways between logic and memory layers of 3D ICs in a 3D SoC. In position A, the multiple memory module stores and accesses data from MPs and FPGAs (4900). The 3D iSoC identifies the fastest route to store and access data in multiple memory layers (4910). The system identifies the shortest distances between logic circuits and multiple memory layer memory tiles (4920). The system identifies the different memory types in each multiple memory layer (4930) and matches specific logic applications with specific memory types (4940). The system then builds a map of different pathways between logic components and memory tiles (4950) and reconfigures logic components to another position (4960).

I claim:

1. A multi-planar memory system consisting of a plurality of memory circuit planes in a three dimensional (3D) stem on a chip (SoC) with through silicon vias (TSVs) comprised of:
    a multi-circuit set of memory circuit layers arranged in a 3D configuration;
    a plurality of memory circuit layers, each layer of which includes memory circuit component types;
    at least one logic circuit layer connected to the memory circuit layers by TSVs;
    wherein the types of memory on memory circuit layers are used by at least one logic circuit layer, which are configured to access at least one memory type on each memory circuit layer using the TSVs;
    wherein when at least one memory type on a memory circuit layer is sandwiched between at least two logic circuit layers, the memory types on the memory circuit layers are connected with TSVs; and
    wherein the memory circuit layers store data and instructions.

2. The multi-planar memory system of claim 1, wherein:
    the memory circuits are on at least two layers of the multi-planar memory system;
    the memory circuits are configured on at least one tile on a layer of the multi-planar memory system; and
    interconnection between at least two memory tiles on a plurality of layers of the multi-planar memory system are connected by TSVs.

3. The multi-planar memory system of claim 2, wherein:
    the configuration of data and instructions stored in specific memory circuits in the multi-planar memory system are rearranged by reassigning the data and instructions to different memory components on at least one tile on a layer of the multi-layer of the multi-planar memory system; and the data and instructions are tagged and tracked in databases in order to identify the storage locations in the multi-planar memory system.

4. The multi-planar memory system of claim 2, wherein: the multi-planar memory system uses multiple pipelines to store and access data and instructions in the memory components simultaneously in at least two tiles.

5. The multi-planar memory system of claim 2, wherein: The data are transferred between multiple memory tiles in the multi-planar memory system simultaneously.

6. The multi-planar memory system of claim 2, wherein: data and instructions are transferred between tiles on different layers of a multi-planar memory system by using TSVs.

7. The multi-planar memory system of claim 1, wherein: the memory circuit layers are accessed by logic circuits on at least one layers in the multi-planar memory system using the TSVs.

8. The multi-planar memory system of claim 1, wherein: when the system accesses data or instructions in two or more memory circuits in the multi-planar memory system, the order of the sequence of processing data or instructions changes in different logic applications.

9. The multi-planar memory system of claim 1, wherein: the logic circuit is a microprocessor, an FPGA, an ASIC or an SoC.

10. The multi-planar memory system of claim 1, wherein: the data are pre-fetched to allocate to specific memory circuits on layers of the multi-planar memory system by anticipating the configuration of reconfigurable logic components for different application types.

11. The multi-planar memory system of claim 1, wherein: multiple pipelines are simultaneously active to store data or instructions in memory circuitry on at least one layer of the 3D SoC.

12. A multi-planar memory system consisting of a plurality of memory circuit planes in three dimensional (3D) system on a chip (SoC) with through silicon vias (TSVs) comprised of:
a multi-circuit set of memory circuit layers arranged in a 3D configuration;
a plurality of memory circuit layers, each layer of which includes memory circuit component types;
at least one logic circuit layer configured to access at least one memory circuit layer by TSVs;
wherein the types of memory in the memory circuit layers are used by at least one logic circuit layer, which are configured to access at least one memory type on each memory circuit layer using the TSVs;
wherein when at least one memory type on a memory circuit layer is sandwiched between at least two logic circuit layers, the memory types on the memory circuit layers are connected with TSVs;
wherein at least one logic circuit layer accesses different memory types on the memory circuit layers in the 3D SoC simultaneously; and
wherein the memory circuit layers store data and instructions.

13. The multi-planar memory system of claim 8, wherein: the logic circuit is a microprocessor, an FPGA an ASIC or a SoC.

14. The multi-planar memory system of claim 12, wherein: data are tagged for identification in a 3D SoC;
data tags update a central database;
when the system engages in a reconfiguration of its evolvable hardware, the data reorganize their configuration in the memory circuits on at least one layer in the multi-planar memory system with new data tags that refer to new data locations; and
the database is updated with new locations of data in the multi-planar memory system.

15. A multi-planar memory system consisting of a plurality of memory circuit planes in a three dimensional (3D) memory module with through silicon vias (TSVs) comprised of:
a multi-circuit set of memory circuit layers arranged in a 3D configuration;
a plurality of memory circuit layers, each layer of which includes memory circuit component types;
at least one logic circuit configured to access and control at least one memory circuit, such logic circuit on at least one tile of a layer of the multi-layer memory system;
wherein the multi-planar memory system is configured as a set of memory types on memory circuit layers in an integrated memory module connected with TSVs;
wherein at least one logic circuit on a tile on one layer in the 3D memory module accesses data and instructions from the memory types in at least one memory circuit layer using the TSVs; and
wherein the memory circuits on at least one layer of the 3D memory module store data and instructions.

16. The multi-planar memory system of claim 15, wherein: the at least one logic circuit is a microprocessor, FPGA, ASIC or SoC.

17. The multi-planar memory system of claim 15, wherein: at least one memory circuit layer on the 3D memory module is accessed simultaneously by at least two logic circuits.

18. The multi-planar memory system of claim 15, wherein: data and instructions are processed in at least two memory circuit layers of the 3D memory module using parallel pipelines.

19. The multi-planar memory system of claim 15, wherein: when data are processed on two or more logic circuit tiles, multiple pipelines are used to store and access data and instructions on different memory circuits in a plurality of layers of the 3D memory module.

20. The multi-planar memory system of claim 15, wherein: the dynamics of data storage continually shift in the 3D memory module by using at least one memory circuit layer;
the at least one logic circuit controls the data reconfiguration process in at least one memory circuit layer in the 3D memory module; and
patterns of data flows in the 3D memory module are modulated by the at least one logic circuit.

* * * * *